US011800908B2

(12) United States Patent
Maddock et al.

(10) Patent No.: US 11,800,908 B2
(45) Date of Patent: Oct. 31, 2023

(54) SILK PILLOW IMPACT PROTECTION DEVICE

(71) Applicant: INO Armor LLC, New York, NY (US)

(72) Inventors: Charles Maddock, New York, NY (US); Grant Chapman, Indianapolis, IN (US); Sean Kleinschmidt, Carmel, IN (US); Ramon Y. Yip, Indianapolis, IN (US)

(73) Assignee: INO Armor LLC, New York, NY (US)

( * ) Notice: Subject to any disclaimer, the term of this patent is extended or adjusted under 35 U.S.C. 154(b) by 0 days.

(21) Appl. No.: 17/704,982

(22) Filed: Mar. 25, 2022

(65) Prior Publication Data

US 2022/0304411 A1  Sep. 29, 2022

Related U.S. Application Data

(60) Provisional application No. 63/166,767, filed on Mar. 26, 2021.

(51) Int. Cl.
*A42B 3/12* (2006.01)
*B65D 81/02* (2006.01)

(52) U.S. Cl.
CPC ............. *A42B 3/12* (2013.01); *B65D 81/022* (2013.01)

(58) Field of Classification Search
CPC ...................................................... A42B 3/12
USPC ................................................ 2/9, 441, 6.8
See application file for complete search history.

(56) References Cited

U.S. PATENT DOCUMENTS

| | | | |
|---|---|---|---|
| 4,860,397 A | 8/1989 | Gusakov | |
| 5,953,777 A * | 9/1999 | Buck | A47G 9/0253 5/636 |
| 6,041,519 A | 3/2000 | Cheng | |
| 6,122,785 A * | 9/2000 | Bondie | A45C 13/02 5/709 |
| 8,863,320 B2 * | 10/2014 | Kelly | A42B 3/121 2/413 |
| 8,915,339 B2 * | 12/2014 | Kanous | B32B 25/042 52/789.1 |
| 10,206,517 B2 * | 2/2019 | Sugano | A47C 27/10 |
| 11,141,009 B1 * | 10/2021 | Rane | A47G 9/10 |
| 2010/0295344 A1 * | 11/2010 | Marsden | B60N 2/2884 297/216.11 |
| 2011/0131695 A1 * | 6/2011 | Maddux | A42B 3/127 2/9 |
| 2011/0171420 A1 | 7/2011 | Yang | |
| 2013/0142985 A1 * | 6/2013 | Yang | B32B 3/12 428/116 |

(Continued)

OTHER PUBLICATIONS

International Search Report and Written Opinion for International Application No. PCT/US2022/022000 dated Jun. 21, 2022.

*Primary Examiner* — Timothy K Trieu
(74) *Attorney, Agent, or Firm* — Stephen J. Kenny; Vincenzo DiMonaco; Foley Hoag LLP

(57) ABSTRACT

A protection device that provides improved protection against damage to the underlying product. The protection device includes silk impact pillows that absorb energy from low or high impacts. The present disclosure provides the ability to adjust a plurality of attributes: 1) pillow stiffness, 2) cocoon density; and 3) cocoon height, to construct a pillow of a desired impact resistance.

19 Claims, 27 Drawing Sheets

(56) References Cited

U.S. PATENT DOCUMENTS

2016/0331556 A1   11/2016  Wijesundara et al.
2016/0360818 A1   12/2016  Riina et al.
2019/0003549 A1    1/2019  Dahl et al.

* cited by examiner

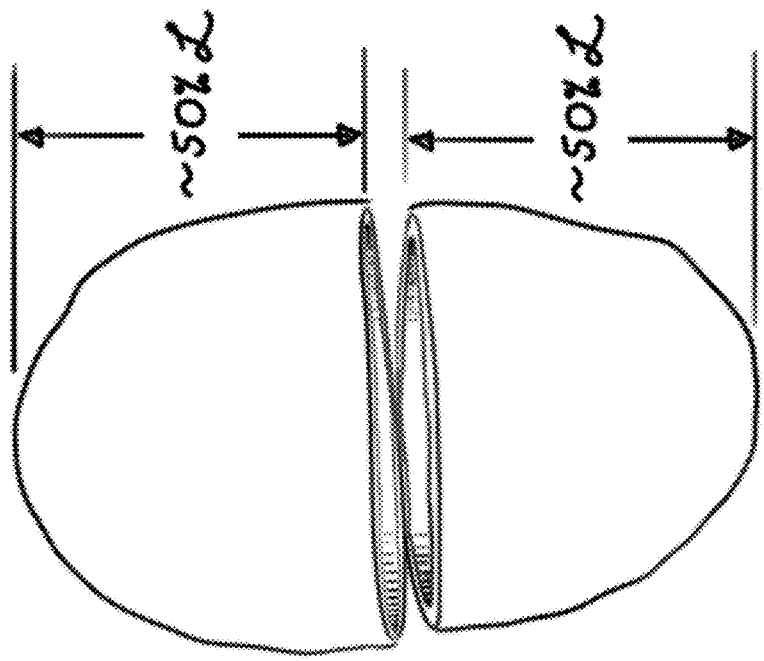
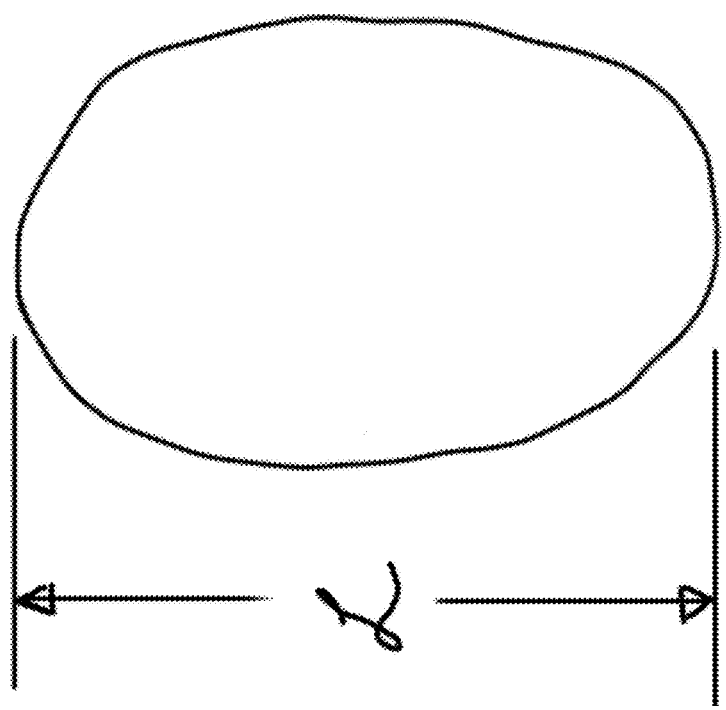
FIG. 1A

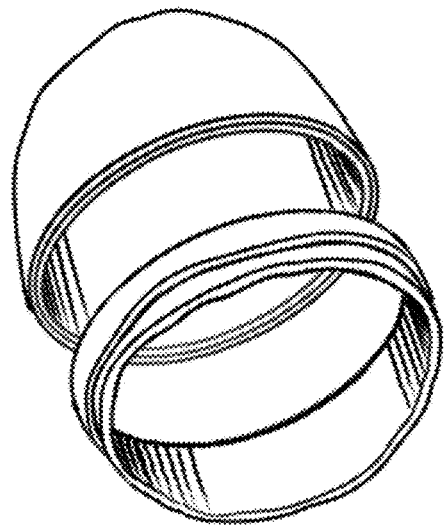
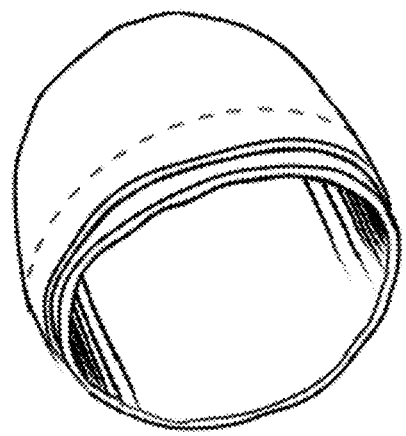
FIG. 2B

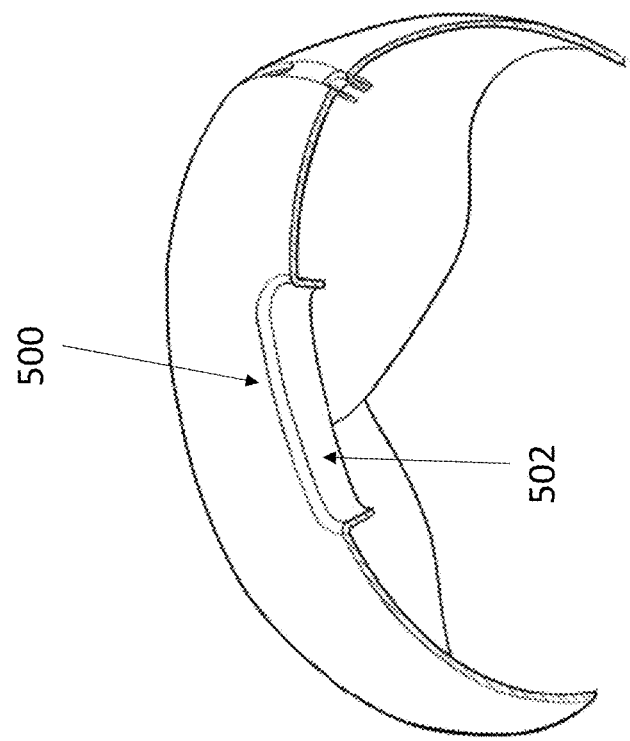
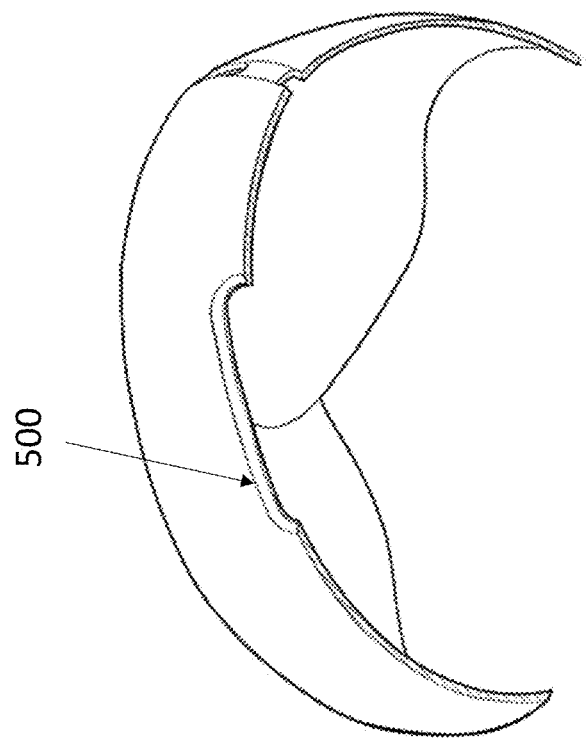
FIG. 11D

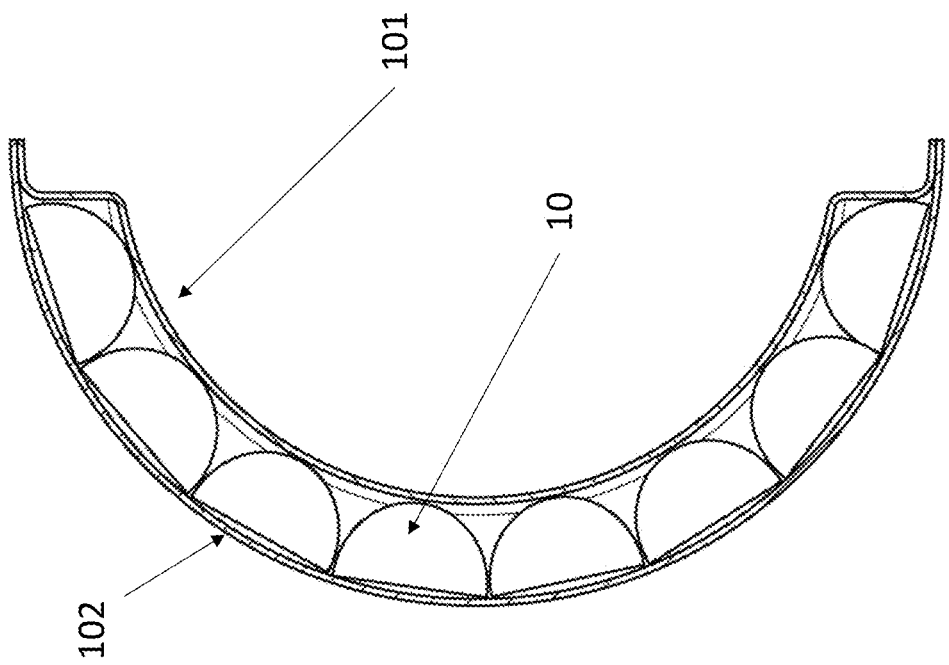
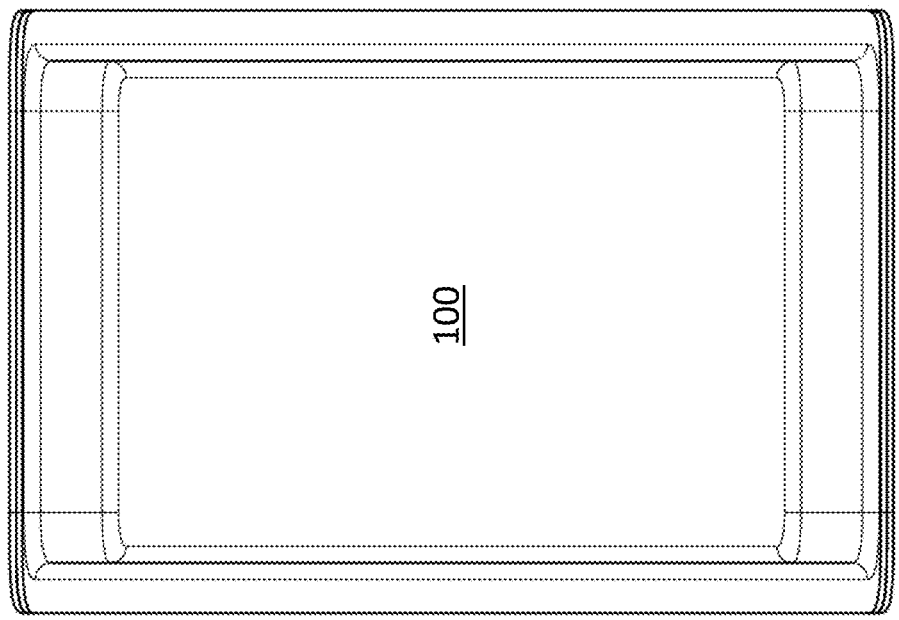
FIG. 15

SILK PILLOW IMPACT PROTECTION DEVICE

CROSS-REFERENCE TO RELATED APPLICATIONS

This application claims the benefit of priority under 35 U.S.C. § 119(e) of U.S. Provisional Application No. 63/166,767 filed Mar. 26, 2021, the entire contents of which are hereby incorporated by reference.

BACKGROUND OF THE DISCLOSED SUBJECT MATTER

Field of the Disclosed Subject Matter

The disclosed subject matter relates to a protection device formed from a silk impact pillow structure, which can absorb energy from low energy or high energy impacts. The device disclosed herein can be employed in a variety of applications where it is desired to protect an item from impact damage. For purpose of illustration and not limitation, some exemplary applications include helmets, consumer goods packaging protection (e.g. electronics, luxury and/or fragile items), art, etc. Reference will be made to helmet embodiments throughout this disclosure for sake of simplicity/illustration, but artisans will understand that the features described herein can be employed in any commercial application.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a protection device comprising: a pillow, the pillow including: a top layer having a first end and a second end, a bottom layer having a first end and a second end, with a circumscribing seal formed between top and bottom layers to define an internal volume within the pillow. The pillow also includes at least one partial cocoon disposed within the pillow, the partial cocoon having a dome shape with a closed apex at a first end and a cylindrical opening at a second end; with the cocoon apex contacting the top layer of the pillow and the cylindrical opening contacting the bottom layer of the pillow.

In some embodiments, at least two partial cocoons are disposed, in vertical alignment, within the pillow wherein each of the partial cocoon abuts an adjacent partial cocoon. In some embodiments, the pillow has an asymmetrical shape.

In accordance with another aspect of the disclosure, a protection device is provided which comprises: a pillow including: a top layer having a first end, a second end, and a first sidewall extending therefrom, the first sidewall including a first outwardly projecting lip which circumscribes the top layer; a bottom layer having a first end, a second end, and a second sidewall extending therefrom, the second sidewall including a second outwardly projecting lip which circumscribes the bottom layer; and a seal formed between the first lip and second lip to define an internal volume within the pillow. A plurality of partial cocoons are disposed within the pillow, with each partial cocoon having a dome shape with a closed apex at a first end and a cylindrical opening at a second end; and the cocoon apex contacting the top layer of the pillow and the cylindrical opening contacting the bottom layer of the pillow; wherein each partial cocoon abuts an adjacent partial cocoon to limit lateral displacement of the plurality of partial cocoons.

In some embodiments, the plurality of partial cocoons includes at least one stack of partial cocoons, wherein each stack includes multiple partial cocoons vertically aligned with the cylindrical opening of a second partial cocoon contacting an exterior surface of an underlying first partial cocoon.

In some embodiments, an apex of a second cocoon in a stack is spaced from the apex of an underlying first cocoon in the stack.

In some embodiments, at least one of the plurality of partial cocoons deforms in a vertical direction with the apex of the cocoon displaced downwardly into the cocoon interior upon application of an impact force.

In some embodiments, at least one of the plurality of partial cocoons maintains a cylindrical opening upon application of an impact force.

In some embodiments, at least two stacks of the plurality of partial cocoons have different heights.

In some embodiments, a first stack of the plurality of partial cocoons comprises two vertically aligned partial cocoons and a second stack of the plurality of partial cocoons comprises three vertically aligned partial cocoons.

In some embodiments, the top layer of the pillow has a curvilinear shape.

In some embodiments, spacing between the top layer of the pillow and bottom layer of the pillow is non-uniform between the edges of the pillow.

In some embodiments, an exterior surface of the pillow can include a strengthening feature.

In accordance with another aspect of the disclosure, a protection device is provided comprising: a plurality of pillows, each pillow including: a top layer having a first end, a second end, and a first sidewall extending therefrom, the first sidewall including a first outwardly projecting lip which circumscribes the top layer; a bottom layer having a first end, a second end, and a second sidewall extending therefrom, the second sidewall including a second outwardly projecting lip which circumscribes the bottom layer; and a seal formed between the first lip and second lip to define an internal volume within the pillow. The device also includes a plurality of partial cocoons disposed within each pillow, each partial cocoon having a dome shape with a closed apex at a first end and a cylindrical opening at a second end; with the cocoon apex contacting the top layer of the pillow and the cylindrical opening contacting the bottom layer of the pillow; wherein each partial cocoon abuts an adjacent partial cocoon to limit lateral displacement of the plurality of partial cocoons; and wherein a first pillow is disposed at a first location within the device and a second pillow at a second location within the device.

In some embodiments, the second position of the second pillow is located below the first position of the first pillow. In some embodiments, the second position of the second pillow is laterally spaced from the first position of the first pillow, with the first end of the first pillow offset from the first end of the second pillow. In some embodiments, the first pillow is configured to move relative to the second pillow. In some embodiments, the first pillow is configured to move laterally relative to the second pillow.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 1A-1C are schematic representations of a full cocoon, cut/partial cocoon, and a tool to be used in sorting the cocoons by diameter for purpose of building stacks of cocoons and a forming a protection device, in accordance with the disclosed subject matter.

FIGS. 2A-B are exemplary views of nested, or stacked, partial cocoons for use in an impact absorption device in accordance with the present disclosure.

FIGS. 4A-I are images of a pillow, with a plurality of partial cocoons sealed therein in accordance with the disclosed subject matter.

FIGS. 11A-D is an exemplary schematic of multiple layers of pillows arranged in an offset manner.

FIGS. 14-15 are another exemplary embodiment (wine bottle protection) of the present disclosure.

DETAILED DESCRIPTION OF AN EXEMPLARY EMBODIMENT(S)

Figure 1C:
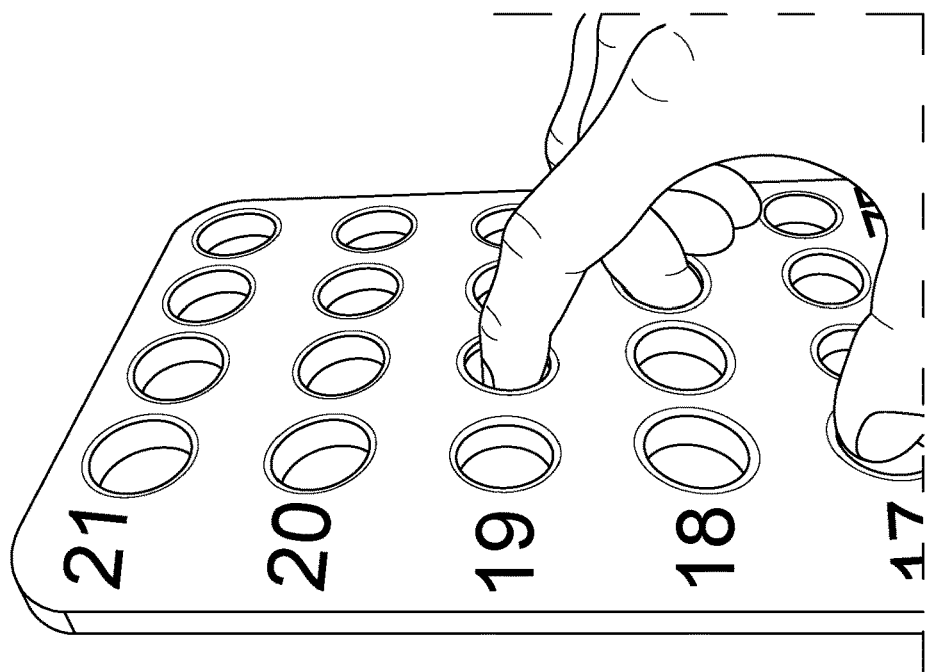

Reference will now be made in detail to exemplary embodiments of the disclosed subject matter, an example of which is illustrated in the accompanying drawings. The method and corresponding steps of the disclosed subject matter will be described in conjunction with the detailed description of the system.

Impact Absorption Cocoon

The present disclosure provides an impact absorbing material which achieves a plurality of goals. The first is to absorb/dissipate energy through the breaking of chemical bonds, permanent deformation of a material, or through transformation of energy from kinetic energy into those such as thermal or acoustic energy. Another objective of the present disclosure is to provide a method to spread out the impulse of an applied load to increase the duration of the impact but lower the peak forces or accelerations experienced.

An exemplary impact absorption cocoon for use in the present disclosure is a silk cocoon produced by a silkworm, *Bombyx mori*, during its transformation into a silk moth. The cocoon is made up of two primary components, a silk fiber called Fibroin and a protein adhesive material called Sericin. Fibroin is the insoluble fiber structure that makes up 70%-80% of the cocoon. The cocoon is created by *Bombyx mori* as a natural composite material with Fibroin being the main fiber component held together by the Sericin protein. This allows the cocoon to exhibit structural characteristics similar to other composite materials in use today such as fiberglass and carbon fiber, where the glass fibers and carbon fibers perform the same function as the Fibroin and the epoxy binder performs the same function as the Sericin. The *Bombyx mori* produce the cocoon in a 2.5D radial construction method, building layer by layer of the hollow shape into the ovoid cocoon final shape. This construction method is similar to the method utilized by fused deposition molding (FDM) 3D printing to build multiple layers of a 2D shape to achieve a 3D shape, as shown in FIGS. 1-2.

A drawback of the silk cocoon as a material for use in products is that Sericin is water soluble. Thus, in accordance with an aspect of this disclosure, the cocoons are protected from contact with water or high humidity to prevent the structural integrity of the material from declining compared to its dry state.

In an exemplary embodiment, the cocoon(s) undergo a first cutting operation where the cocoon is cut, e.g. approximately in half, and the pupae removed (as shown in FIG. 1A the ovoid has a length "L" which is cut approximately in half). A subsequent/second cutting operation can then be performed to ensure that each cocoon half (or stack of cocoon halves if multiple halves are aligned in vertical layers, as discussed further below) are of equivalent height. This cutting operation can be performed via hot wire cutting, and in some embedment's the wire can be heated to facilitate the severing of cocoon halves. The (full) cocoons exhibit an ovoid shape, and the cutting operation can be performed at a midpoint of the major axis between the tip and base of the ovoid. Additionally, in some embodiments the cocoons are free of any external/pre-loading before undergoing the cutting operation(s).

Figure 1B:
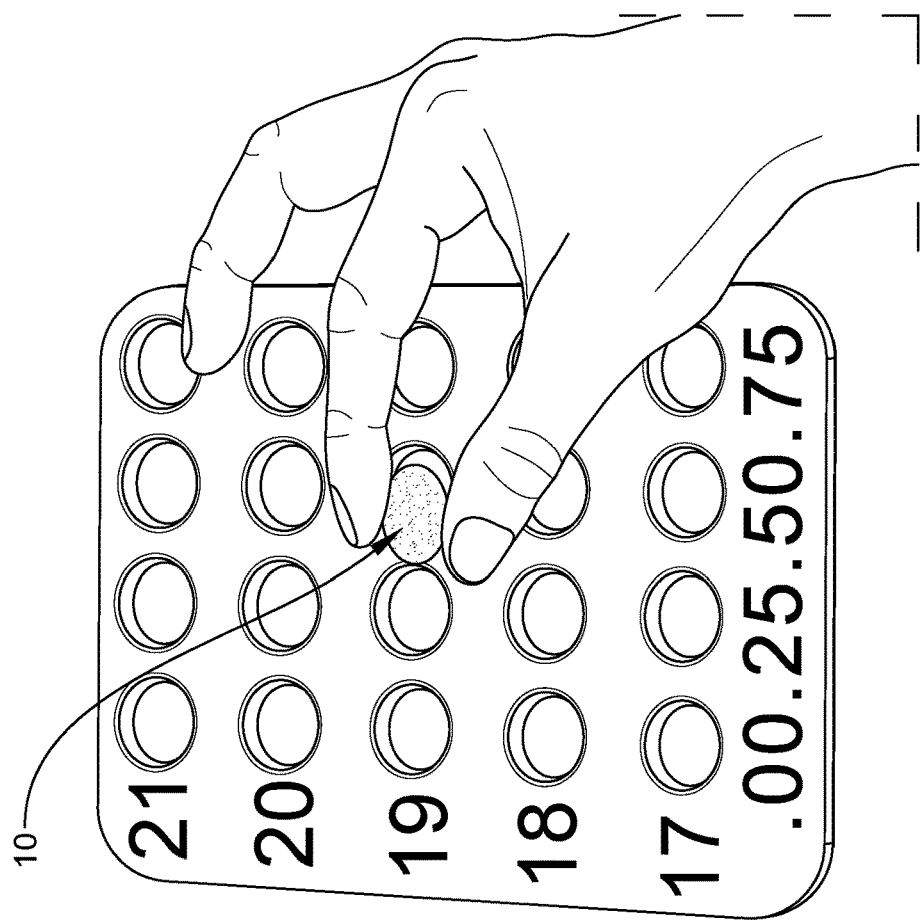

The cocoon halves 10 are then sorted by diameter using a sorting jig with holes increasing in diameter in 0.25 mm increments (See FIGS. 1B-C). The acceptable range of diameters for the cocoons varies according to the intended application (e.g. helmet vs. packaging insert) and total statistical spread of the diameters of the cut cocoon halves. For example, an acceptable range for use in a packaging insert is from 17.50 mm to 21.75 mm. The diameter of the cocoons can affect the energy absorption capacity per cocoon half, thus the present disclosure uses an even mix of larger and smaller size cocoons within a given area to average the impact absorption properties. The smaller diameter cocoons can be deliberately located proximate the edges of the impact absorbing device (or "pillow" as described below), where the space between sidewalls and bottom/top surfaces can be reduced due to rounded/angled/chamfered edges.

Figure 2A:
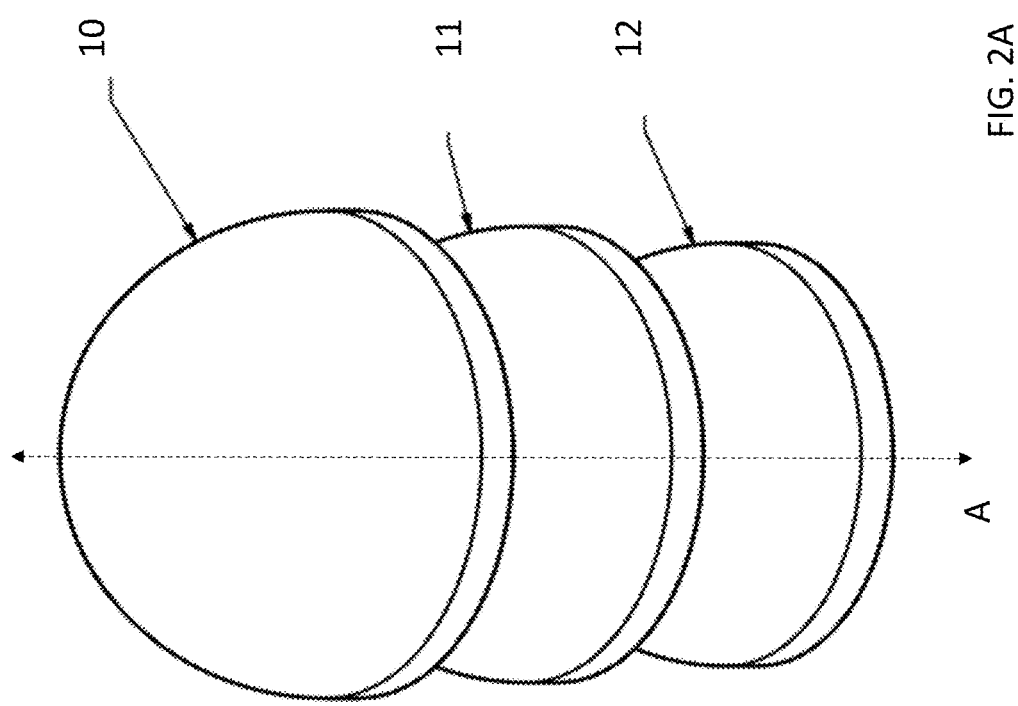

This sorting process is performed because a single wall thickness of single cocoon 10 provides an insufficient material density for impact absorption in some applications. In order to alter the net material density of a cocoon impact absorption material, multiple cocoon halves 10-12 are stacked together to increase the density—within the same pillow volume, as shown in FIG. 2A-B. In accordance with an aspect of the disclosure, a first (lower) cocoon half 12 is aligned about a central longitudinal axis "A", and at least partially inserted, or "nested", within a second (middle) cocoon half 11, which is in turn partially inserted within a third (upper) cocoon half 10. Although three cocoon halves are illustrated in this exemplary stack/column, alternative numbers of cocoon halves can be employed, as desired. In some embodiments, an air gap or space can be present between apices of adjacent/stacked cocoon halves. Additionally or alternatively, no air gap or space can be present between apices of adjacent cocoon halves, e.g. the apices of adjacent cocoon halves can be in contact.

Additionally, the entire circumference of the cut edge of the second (upper) cocoon half 11 is in contact with an outer surface of the lower cocoon halve 12. Similarly, upper cocoon half 10 can engage cocoon half 11 about its entire circumference. The stack can be constructed with cocoon halves of progressively increasing diameter as the stack height increases. For example, in the first/lowest cocoon 12 has the smallest diameter in the stack (e.g. 17.50-18.0 mm); the second/middle cocoon 11 has a larger cocoon (e.g. 18.25-18.75 mm); and the third/top cocoon 10 has the largest relative diameter (e.g. 19.00-19.50 mm).

In accordance with an aspect of the present disclosure, the number of cocoon halves in a stack can be adjusted to alter the density, and thus the stiffness, of a cocoon stack to achieve a desired impact resistance for a given application.

Once the cocoons have been stacked to the desired height/density, the cocoons are then cut to a specified height. This cutting step allows each cocoon stack (within a subset of all cocoon stacks) to have an equivalent and/or controlled height so that they can be packed into the pillows (discussed in further detail below) and seat evenly between the top and the bottom of the pillow. While the height of cocoon stack(s) can be modified (e.g. cut) to ensure uniform dimensions across commonly situated stacks, the width of adjacent stacks within this subset of stacks can be varied. The thickness of the cocoons can vary and thus the overall diameter of the stacks can differ; thus this variation in thickness/diameter can be evenly distributed throughout a pillow to achieve macro uniformity In some embodiments, a plurality of cocoon stacks can be formed having different heights, with select stacks that are to be positioned within a common area of the pillow (e.g. center vs. edge) cut to have equivalent heights to ensure proper positioning within the pillow. In other words, the cocoon stacks at the center region of the pillow can have a greater height than the cocoon stacks at the edges of the pillow (where the top/bottom of the pillow may be sloped or converge to form a sealed edge housing the cocoons therein). For example, this even height (within a particular region) ensures the cocoon stacks are held together snugly and completely fill the pillow structure thereby preventing undesired drift or rattling between cocoons. In some embodiments, once cocoons are fitted within the pillow, they are prohibited from moving laterally and can only compress (via deformation) vertically along axis "A" in FIG. 2A. This (second) cutting step also allows for the control of the height of the cocoon stacks to suit the end need of the product.

The devices of the present disclosure employ cocoons to achieve impact absorption through a variety of mechanisms. These devices are constructed to strike the optimal balance between flexibility (to allow implementation and adaptability to a wide array of product shapes and potential impact forces) and rigidity (to provide sufficient structural integrity to absorb impact). For example, if a material is too soft, the material will completely crush or collapse before the impact event is over, thus any residual energy present in the impact event/force will be transferred directly to the object being protected. This causes an impact curve to appear favorable in the beginning of the curve, with low forces and low acceleration numbers, but causes the rest of the impact to have very high accelerations and forces once the material has run out of room to deform.

Conversely, utilizing a material that is too stiff causes the material to transfer too much of the impact through the material to the object being protected as the material does not utilize the full distance of deformation during an impact. This causes a large force and acceleration values during the peak of the impact. The goal with impact absorbing material is to modify the stiffness or density of the material so that during the "worst case" impact that the material is required to protect from, the material deforms to a high percentage of the original size but never fully "bottoms out" or reaches complete collapse. This allows the material to absorb the maximum amount of energy as well as slow down the impulse to spread the remaining energy out over a longer period of time, thereby causing the peak forces and accelerations to be lower. This modification of material density and stiffness is achieved via the cocoon stacking methodology, allowing for the selection and control of specific density to impact the volumetric density and stiffness of a cocoon stack.

Dome Shape

In some embodiments, the cocoons exhibit an ovoid shape (See FIG. 1A). When cut in half this creates two units with an open end having a generally cylindrical section that terminates in a closed dome shape or apex. This dome shape provides significant structural rigidity as force is applied to the top or apex of the dome the force is distributed throughout the fibroin fibers and sericin protein down and around the curvilinear walls of the cocoon half. The dome shape allows the forces to be evenly distributed through the composite without stress concentrators, e.g. the absence of corners or acute angles within the cocoon half prevent localized stress concentrations or "pinch points". This lack of stress concentration allows the cocoon to evenly distribute the applied load throughout the cocoon geometry thus providing the shape a high structural efficiency. This leads to a low overall density which is desirable in an impact absorbing material so that the end products produced can be lightweight and effective.

Cocoon Energy Absorption

As the dome shape is loaded, the load increases to the yield point of the composite material. The first step in failure is the breaking of the sericin bonds at the layer lines as well as breaking of the sericin circumferentially throughout a planar slice of the cocoon. The breaking of these sericin bonds dissipates energy from the impact. However, as the fibroin fibers can be considered continuous within an area of interest of the cocoon and the fibroin fibers have very high tensile strengths, especially compared to the sericin protein (e.g., greater by an order of magnitude or more), these fibers allow the structure to retain its general shape and transfer the load to the next/adjacent solid sericin bond. As this load is transferred and more sericin bonds break more and more energy (of the impact force) is dissipated. At the macro level this eventually results in a buckling style failure in the dome shape where the tip of the dome is pressed down, resulting in a roughly cylindrical contact area at the next cocoon disposed underneath.

Figure 3A:
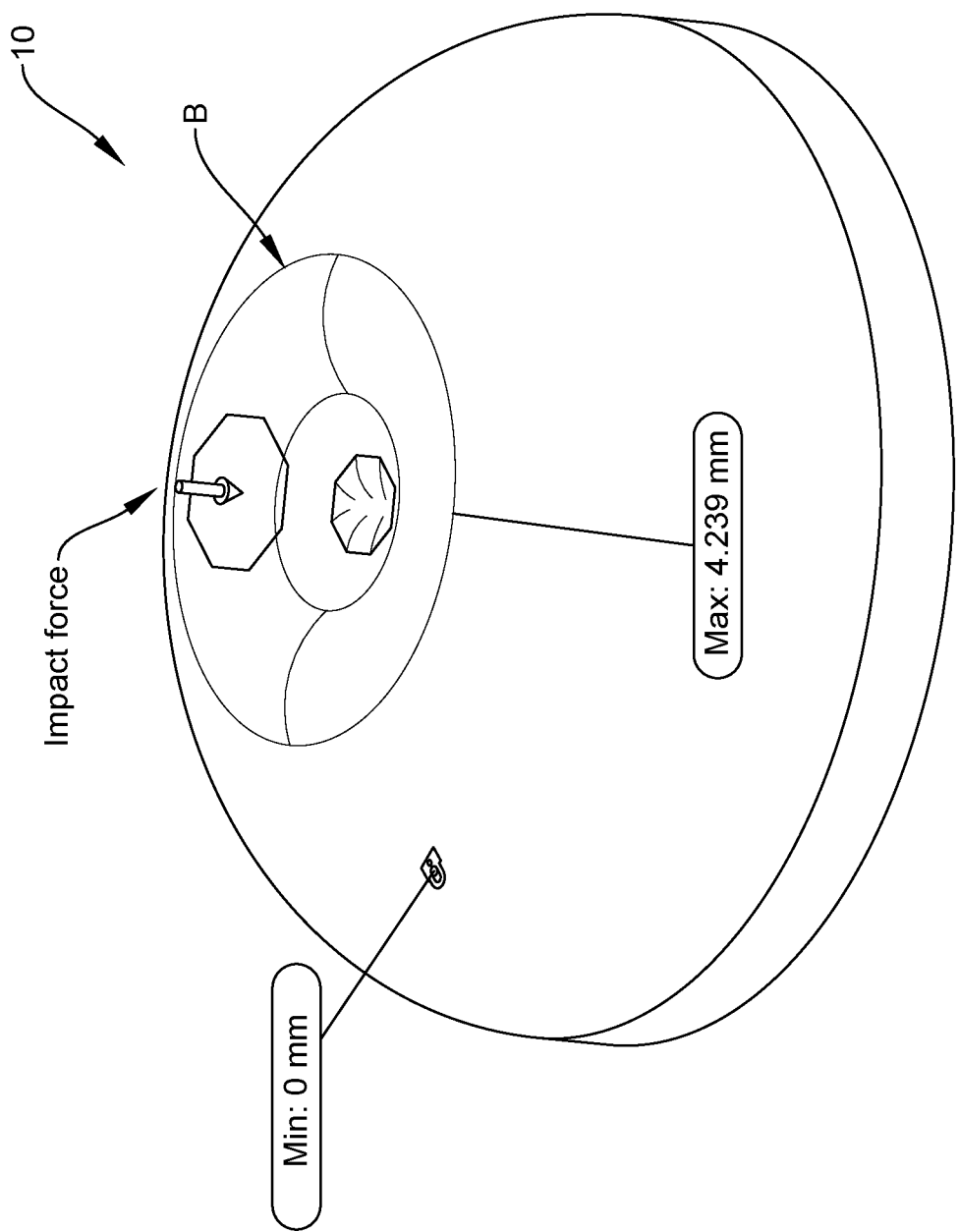
FIG. 3A is a schematic representations of a single/isolated partial cocoon during deformation from an impact, in accordance with the disclosed subject matter.
Figure 3B:
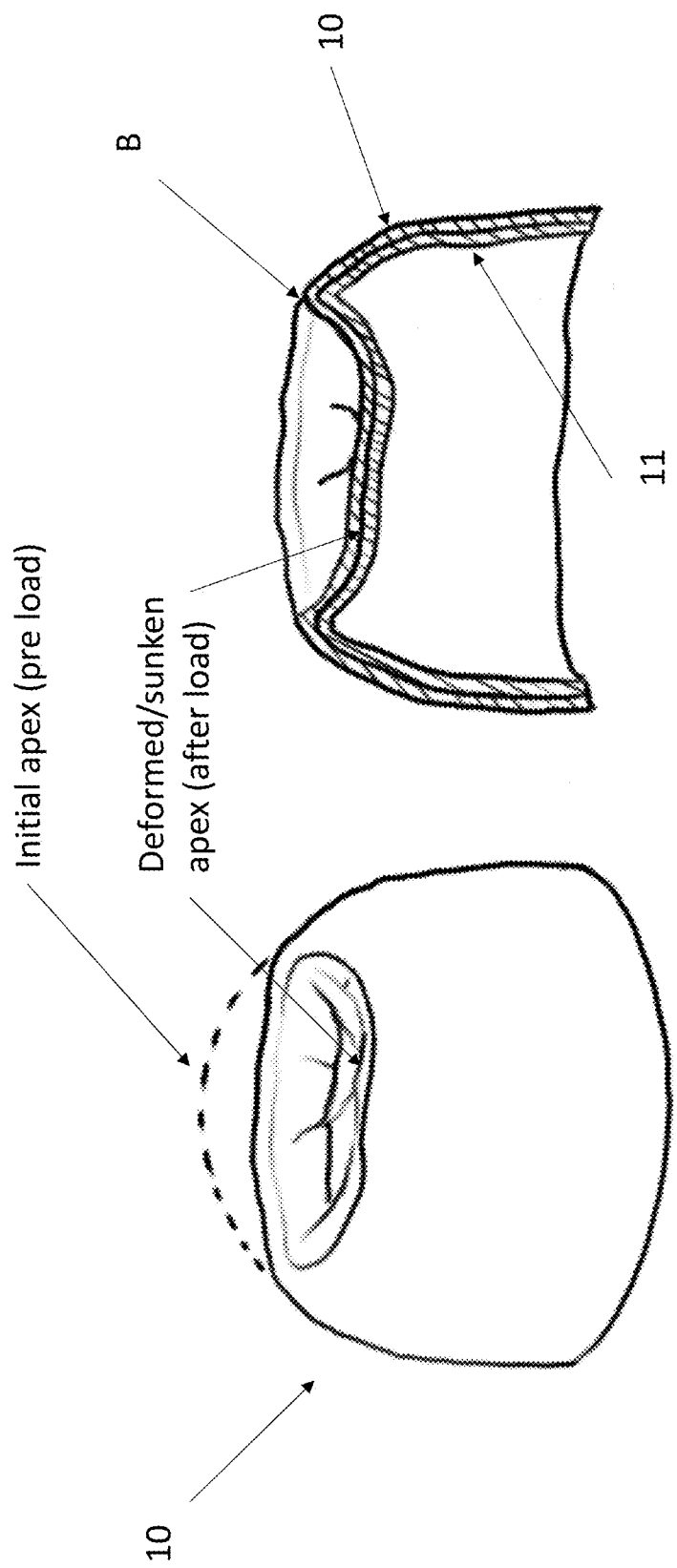
FIG. 3B illustrates a deformed cocoon stack.
Figure 4B:
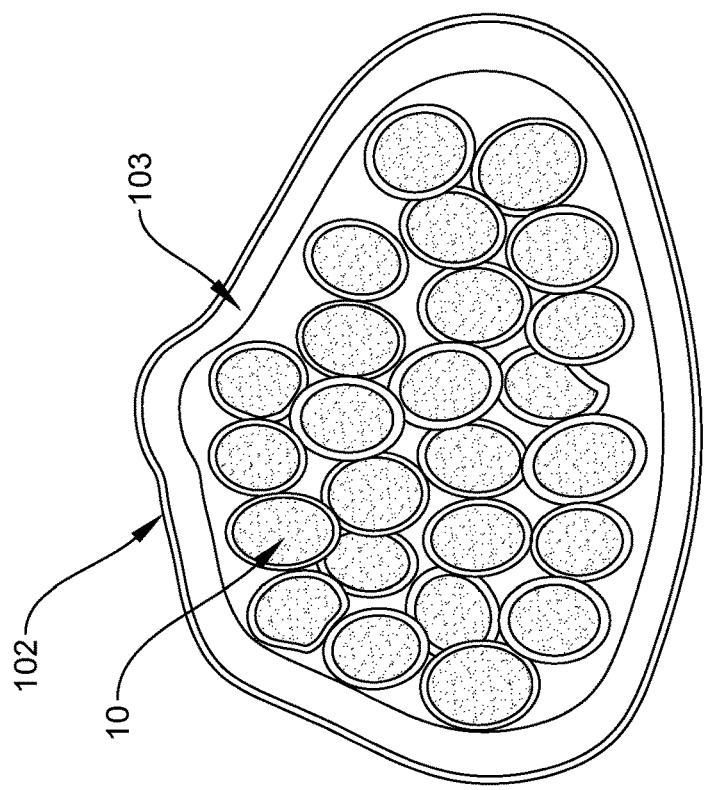
Figure 4A:
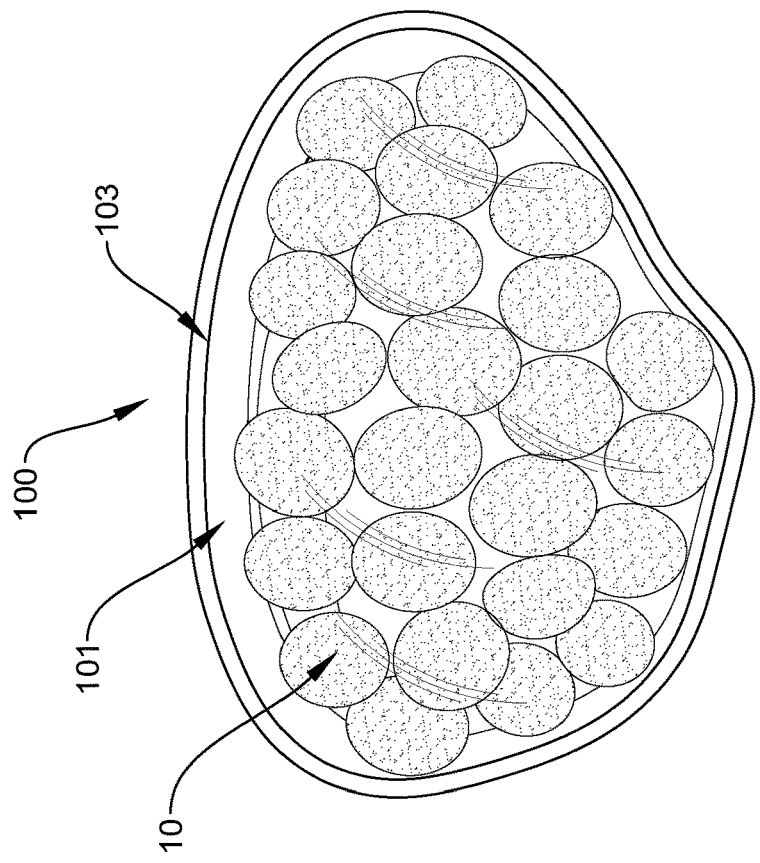
Figure 4C:
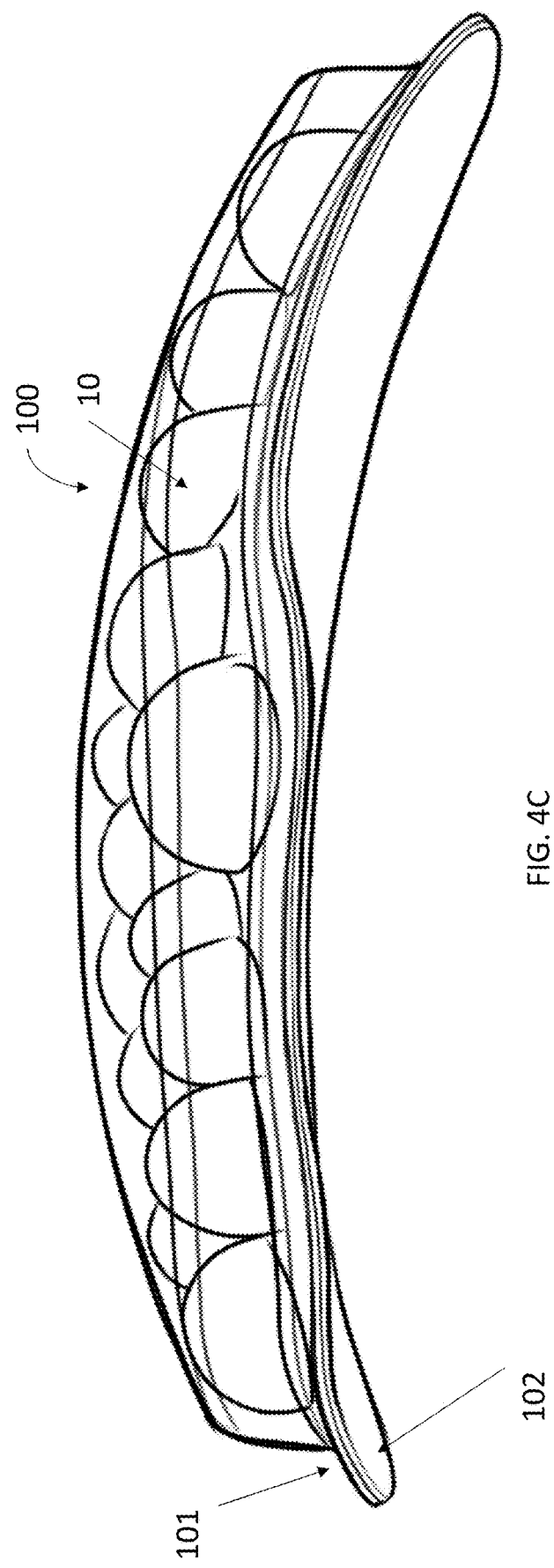
Figure 4D:
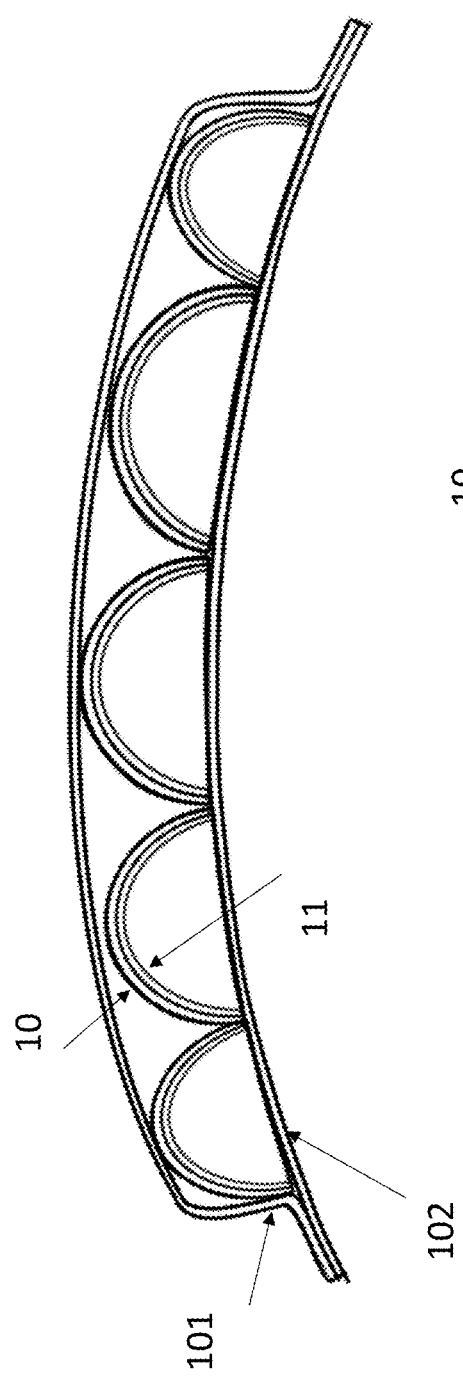
Figure 4E:
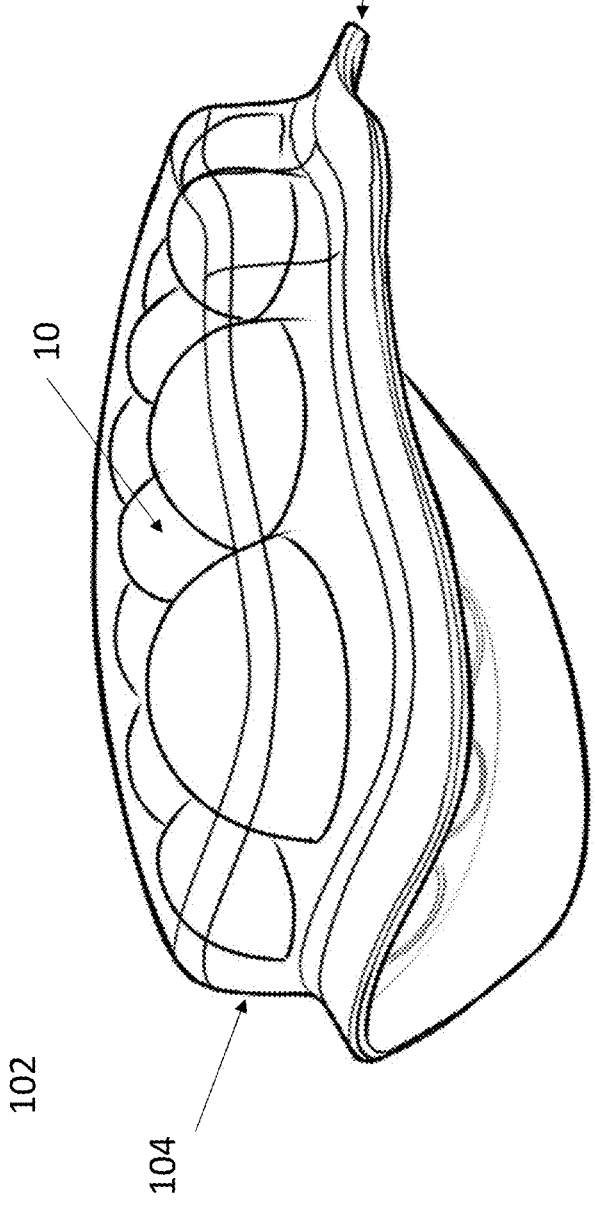
Figure 4H:
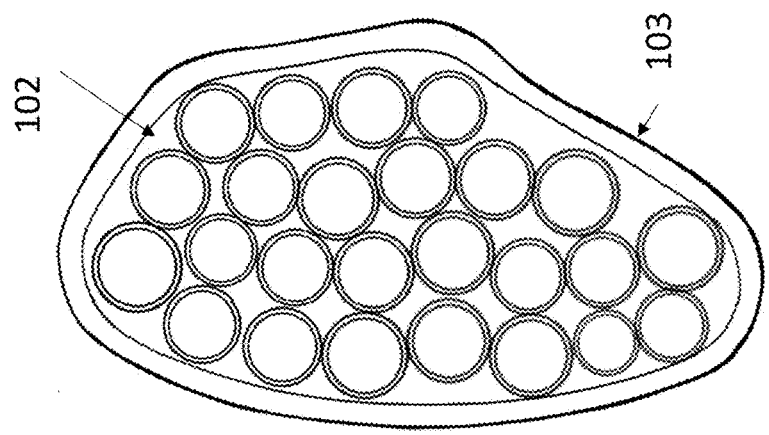
Figure 4G:
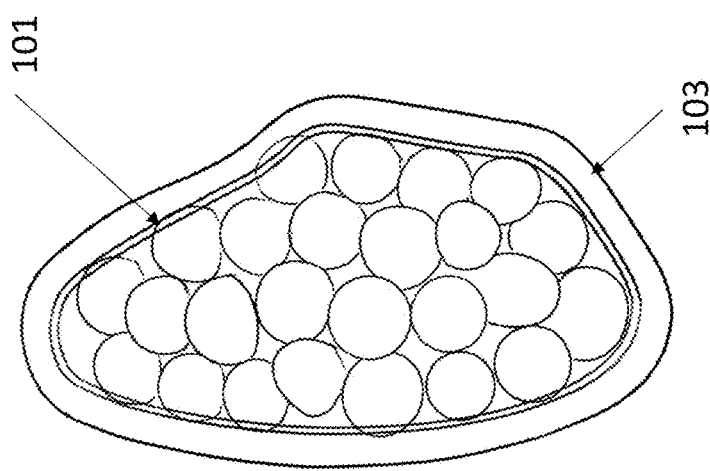
Figure 4F:
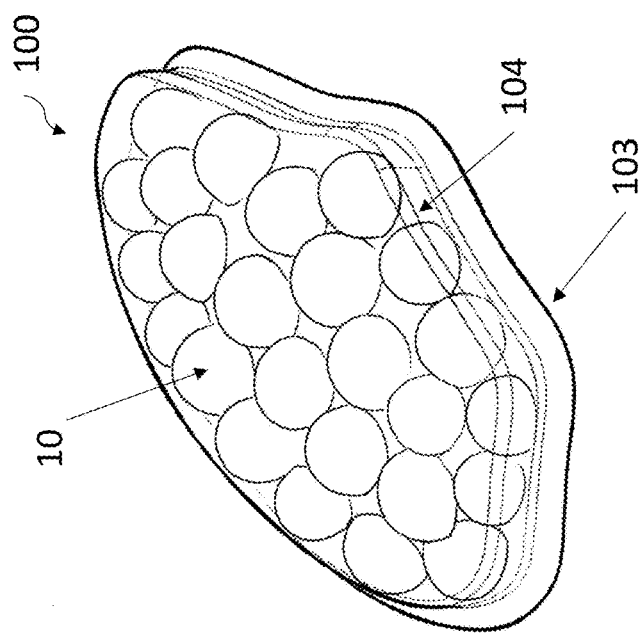

As exemplary illustration of this mode of deformation is shown in FIGS. 3A-B where line "B" denotes where the cocoon 10 will deform or crush downwardly, to make contact with the underlying cocoon (not shown for clarity) and transfer the (reduced due to deformation of cocoon 10) Impact Force to the underlying cocoon(s).

This failure method continues, as the center/apex of the dome is pressed lower/downwardly into the cylindrical portion of the cocoon, the contact area moves from one layer to break the next layer of sericin bonds before those bonds fail to a sufficient amount that the deformation moves the contact line again to the next layer below and the process repeats until the cocoon stack is fully crushed. This process can occur in a stack with a single cocoon, but also happens with stacks of more than one cocoon half such that the contact line may be thicker with more cocoons in a stack; either as an individual cocoon or as plurality of stack cocoons—all of the cocoons in the stack have their sericin bonds fail in a given plane of contact/action and then all of the cocoons involved move to the next layer for the failure process to repeat). This phenomenon can be seen in FIG. 3A-B with the line "B" representing the next contact surface. This buckling style failure allows the cocoon to continue to dissipate energy as multiple layers fail while retaining macro structural integrity and transferring the load throughout the cocoon to the next layer. Another feature of the failure method employed in the devices of the present disclosure is the relative difference in active surface area of the load application. The cylindrical base has the largest surface area of the cocoon half, and is thus the strongest cross section at any point during loading and buckling. This ensures that the base of the cocoon can remain intact throughout the crush/deformation of the layers above it and continues to transmit forces to the structure below (e.g. the bottom of the pillow). This enables the cocoon to utilize the maximum amount of layer failures before the macro structure of the cocoon stack is compromised.

In some embodiments, the cocoon halves within a given stack are all the same size (e.g. height) and nested such that all of the cylindrical surfaces/faces of the cocoons are at the same height, e.g. are coplanar or "flush" with each other. This can be accomplished in the cutting step for the stack of the manufacturing process, where, within a stack, the cylindrical base section does not contact the dome or wall section of the cocoon below it as they are completely nested (e.g. fully inserted into each other)—rather than partially inserted and stacked on top of one another. Thus, an individual cocoon height can be equivalent to the aggregate height of a cocoon stack (containing multiple cocoons therein); for instance, if cocoons are 10 mm tall, a single, double, or triple stack are all 10 mm tall, rather than a cascading/aggregate height of 10 mm, 20 mm or 30 mm respectively.

A variety of cocoon heights can be employed in accordance with the present disclosure. In some embodiments, an ideal ratio of crushed height to initial height for a given impact is employed such that the cocoon continues to crush until 100% of its height is crushed (e.g. the apex of the dome is coplanar with the cylindrical opening formed at the cut-line of the cocoon half). Additionally or alternatively, in some embodiments it is not desirable for 100% of the cocoon to be collapsed—e.g. if a design is such that 100% of the material is designed to be crushed, if the load ever exceeds the design load by 1%, there would be no impact attenuation of that last 1% and high forces and G's could be passed to the object being protected.

Similarly, the other end of the spectrum can be equally undesirable in that if only 5% of the height is crushed the impact material would need to be 20 times thicker than the 100% crushed scenario. Thus, the impact absorption devices disclosed herein can be configured with a ratio, which for purpose of illustration and not limitation can be approximately between 50% and 75% crushed (e.g. the apex of the cocoon is displaced downwardly into the cocoon interior a distance that is approximately 50% — 75% of the original/unloaded cocoon height, measured from cylindrical opening to apex). This also allows the cocoons to retain their cylindrical base, which has a larger cross sectional area than the portion of the dome that is actively deforming, allowing the base to last throughout the entire crush so that the unit does not completely collapse prematurely.

Impact Absorption Pillow (100)

The pillow 100 is a structure that houses a number of cocoons (whether arranged in stacks of a plurality of cocoons, or as isolated/singular cocoons—reference to "cocoon" or cocoons" should be understood to include stacks of cocoons) and holds them into a desired shape, as shown in FIG. 4. In some embodiments, the pillow can have designated areas, or cells, for securely positioning the cocoons. For example, top and/or base layer(s) of the pillow structure can include (internal) surface features (e.g. indents, protrusions, etc.) that engage with the cocoon and serve as a retention feature to inhibit/prevent lateral movement of that cocoon. The retention of the cocoon in a single/predetermined location is advantageous in that it ensures a protective barrier remains present at any given location throughout the interior of the pillow (e.g. there are no cavities or voids). These surface features can be formed in a variety geometric forms or shapes, e.g. circular to engage the circumference of the cocoon half, or discrete "pegs" projecting between adjacent cocoons to prevent relative (lateral) movement of the cocoon and the pillow. In some embodiments, no surface/retention features are present, and the cocoons are instead held in position via friction fit, e.g. each cocoon abuts at least one neighboring cocoon to prevent lateral movement (with the cocoons along the edge of the pillow retained in position via the boundary of the pillow structure).

These pillows can be mounted within the end product (e.g. helmet, consumer goods packaging, etc.) in a variety of methods. These pillows can vary in their size and shape to fit the requirements of a given application. For example, the pillow can be formed with uniform thickness/height (with a uniform number of cocoons in each stack housed therein) throughout the pillow. Additionally or alternatively, a pillow can be formed with varied dimensions at select locations, e.g. a first section having a first height with a first number of cocoons in a first stack; and a second section having a second height with a second (larger or smaller) number of cocoons in a second stack. Additionally, the pillow can be formed with a symmetrical or asymmetrical shape.

The pillow can be made from a variety of materials, and exhibit a solid and relatively stiff construction that can be formed to various shapes and sizes. For purpose of illustration and not limitation, thermoplastics (e.g. Polycarbonate) can be utilized to manufacture the pillows. However, any material that has sufficient stiffness and strength and can be formed into the required shape can be used. In some embodiments, the pillow is a multi-part (e.g. two piece) structure that is bonded together utilizing a variety of methods such as adhesive, ultrasonic welds, thermal welds, magnets and any other bonding technology that creates a watertight seal.

The pillow 100 provides several key functions to the impact absorption devices disclosed herein. For example, the pillow holds the cocoons 10 into the desired shape without the need for adhesives. A first portion, e.g. top layer 101, of a pillow is formed to the desired depth to house the cocoons 10-12 with a sealing lip 103 that allows the second/bottom portion 102 of the pillow to be attached and sealed. The hermetic seal can be achieved via adhesives and/or welding. The second/bottom portion 102 can also be formed with a sidewall that aligns with the sidewall of the first/top portion, when joined. Additionally or alternatively, the second/bottom portion 102 can be a generally planar member that is joined to the lip 103 of the first/top portion. In the exemplary embodiment shown, the cut portion of the cocoon is positioned adjacent to the bottom layer, so that the interior of the cocoons are visible when viewed by the bottom as shown in FIG. 3B (assuming the bottom layer 102 is transparent). Additionally or alternatively, the cocoon halves can be arranged in an alternating sequence such that some of the domes face "up" (abutting top layer 101) and some of the domes face "down" (abutting bottom layer 102).

The exterior surface(s) of the top 101 layer and/or bottom layer 102 can be constructed with the desired shape for the intended application (e.g. curvilinear for helmets, planar for boxes/packaging; and/or combinations thereof). This surface (s) can be completely contiguous to the selected surface (e.g. helmet interior) of the end product for which the pillow will engage. Additionally or alternatively, the exterior surface of the pillow can include (external) strengthening features (e.g. ribs as discussed below). As noted above, at least one of the top 101 or bottom 102 layers is formed with sidewall(s) 104 that extend, e.g. perpendicularly, or any desired angle. The sidewall angle can be uniform, or vary around the perimeter of the pillow. In some embodiments, the sidewall is tangent to the surface of the adjacent cocoon.

The edge between the sidewall and the top surface 101 can have a filet of any desired radius of curvature for ease of manufacturing and/or enhanced strength. The sidewall 104 connects to the lip 103 projecting laterally outward, e.g. perpendicular the sidewall. The lip 103 provides sufficient surface area to mate to the top/bottom 101-102 parts of the pillow and create a seal. This seal prevents moisture or water ingress within the pillow, thereby preserving the structural integrity of the interior cocoons. The lip 103 can extend outwardly form sidewalls 104 at only select locations, or circumscribe the pillow 100 and provide a surface area to facilitate coupling in the end product (e.g. helmet structure) in which the pillow is to be mounted through, e.g., adhesive, mechanical fastening, or magnetic coupling product, or a fastening mechanism of any kind as holes or notches can be manufactured into the lip. In some embodiments, the lip 103 is formed at a midpoint of the pillow height, whereas in other embodiments the lip 103 is formed at the bottom of a pillow 100. In some embodiments, no lip is present and instead the sidewall(s) 104 are joined directly between top and bottom layers 101-102.

The top and bottom layers 101-102 can be formed in separate molds, with cocoons placed at desired locations within one of these mold halves, and the other (empty) mold half closed (e.g. in a "clamshell" rotation/pivot motion) to seal the cocoons between layers 101-102. To prevent cocoon drift during manufacturing, an electric charge can be imparted into the cocoons to prevent relative movement thereof. Additionally or alternatively, an adhesive can be used to tack the surface of the pillow during manufacturing such that the cocoons can be inserted into a place and prevent relative motion therebetween.

Pillow Structure

The pillow 100 can contain a multitude of cocoon stacks 10-12 inside each unit. The pillow transmits an impact load on the outer surface and distributes (e.g., evenly) this force between the cocoons within the pillow. This is advantageous in that it limits the peak force per cocoon stack by sharing the load with the neighboring cocoons. This is accomplished by the pillow shell's outer layers, but not the sidewall 100 being a more rigid structure than the internal cocoons 10-12, as this allows more force to be applied to a wider area/number of cocoons 10-12 before deformation of the pillow 100 surface—which would prevent the load from being evenly shared by the cocoon stacks.

The rigidity of this structure can be altered in a number of ways. For instance, a more stiff material can be utilized for the pillow, but this approach results in the entire assembly more being stiffer, which can be disadvantageous. For example, a stiffer pillow material 100 will stiffen the sidewalls 104 of the pillow in the direction of crush, thus transferring energy around the cocoons 10-12 and directly through the pillow 100. Thus, the present disclosure provides a method of achieving more energy dispersion among the cocoons within a pillow, without causing the pillow to be stiff in the direction of crush. This is accomplished by utilizing geometric features in the pillow 100 to import planar stiffness into the load sharing faces (101, 102) while simultaneously designing geometric features into the sidewalls 104 to reduce rigidity, thereby facilitating the cocoons 10-12 to transmit the crushing received from the exterior pillow 100.

Figure 41:
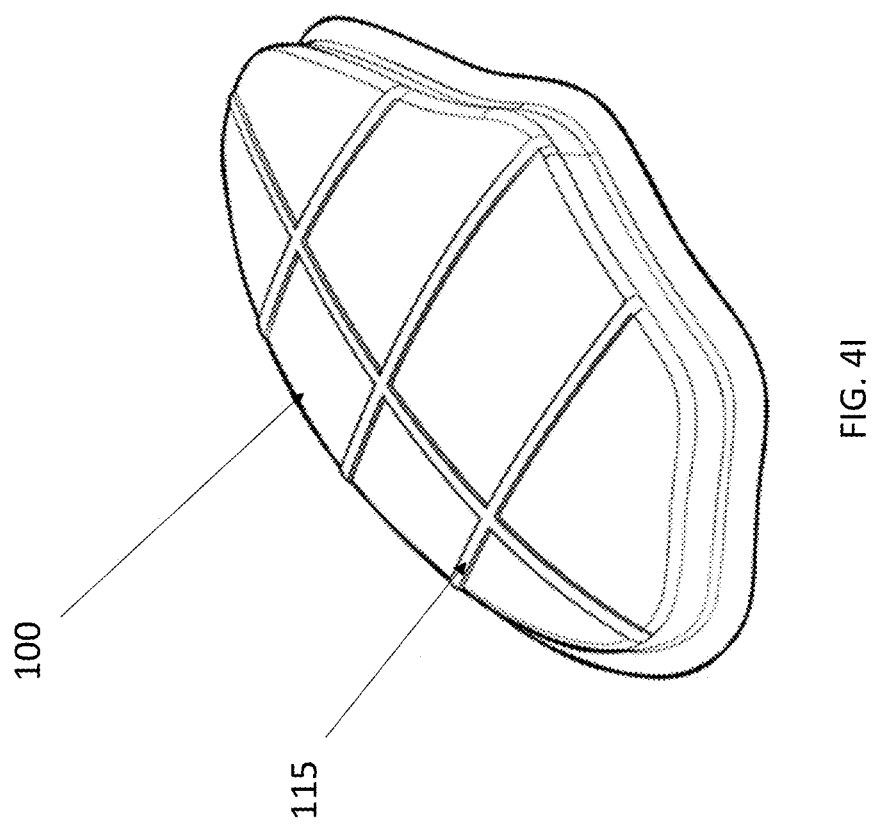

An example of a rigidity-increasing geometric feature that can be included in the exterior surfaces 101, 102 of the pillow is that of projections/ribs 115 (as shown in the exemplary embodiment of FIG. 41) which project over select portions, or an entirety of the these surfaces. In the embodiment shown, a plurality of intersecting ribs 115 are provided that span the entire lower surface (intersecting at 90 degree angles, though alternative angles can be employed as desired). These ribs will act similarly to an I-beam and allow for an increased effective stiffness of the exterior pillow surface without adding undue strength to the sidewalls 104. Also, an example of a rigidity-decreasing geometric feature in the sidewalls 104 that can be included would be that of accordion-like structure (or fins, score lines, etc.) that route the impact force and promote deformation of the sidewall under less load, thus allowing the cocoon stacks to receive (and disperse) the loading force.

In accordance with another aspect of the disclosure, the energy dissipation performance of a pillow 100 can be adjusted by altering the cocoon stacks within a pillow. For example, the pillows 100 can be manufactured to various heights that in turn accept various heights of cocoon stacks. The taller a cocoon stack is the more distance of deformation there is and thus the stack can absorb more energy than a shorter cocoon stack. In some embodiments, various areas of a pillow 100 can be configured with different heights of cocoon stacks. That is to say that a single sealed pillow may contain various heights of cocoon stacks within it. This ability to vary in height within a pillow allows for the adjustment of the impact absorption within specific areas of a pillow. This can be advantageous in pillows where one may want to have a shorter pillow in a specific area for aesthetic or functional purposes; or the converse where the designer may need to increase the impact absorption capabilities in a specific area, while keeping the height (and/or overall product weight) lower in other areas.

Figure 11A:
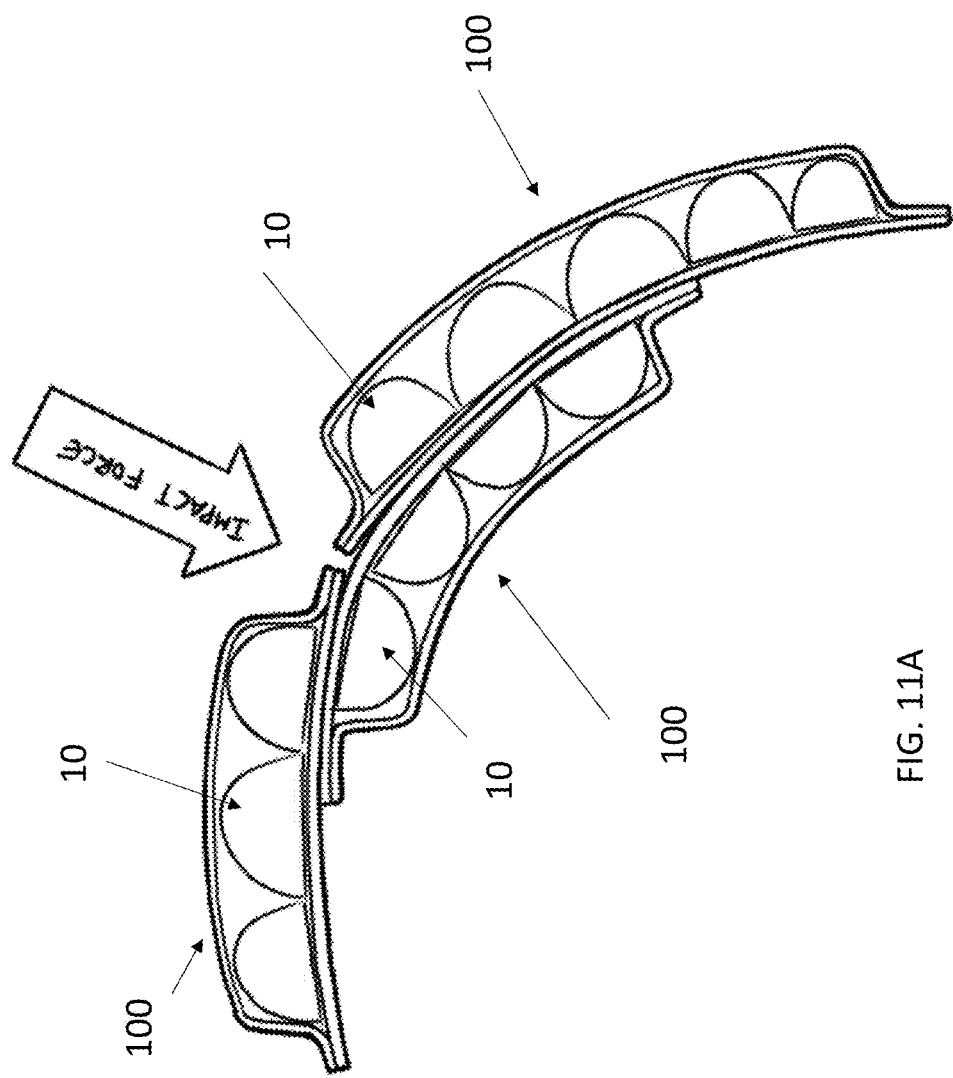

Although the exemplary embodiments shown depict a single pillow with a plurality of cocoons therein, any number of cocoons can be included within a pillow 100. Furthermore, in some embodiments, a pillow may include multiple sub-pillows included therein—with each sub-pillow housing a number of cocoon(s) therein. (Also, the internal sub-pillows need not be sealed since they are themselves sealed within the outer pillow). The pillows can be oriented in a variety of ways, e.g., they need not be vertically aligned but instead can be stacked in a manner in which vertically adjacent pillows are laterally offset relative each other, as shown in FIG. 11. This variability allows the impact resistance to be scaled up/down as desired and varied across the surface of the product.

The cocoon stacks 10 that are assembled into a pillow 100 can have various amounts of cocoons per stack, and varying the amount of cocoons per stack changes the stiffness and ability to absorb impact of the stack, as described above. Within a pillow 100 the overall impact absorption of the pillow can be modified by modifying the style of stacked cocoons contained within. For example a pillow of the same design may contain double or triple stacked cocoons, this would cause the triple stacked variant to be more stiff and absorb energy more effectively from a higher impact, but may make it too stiff to effectively absorb impact from a lower impact scenario.

This cocoon stack density can also be varied in a non-discrete way by modifying the amount of each style of stack within it. For example, a pillow with 20 discrete cocoon stacks may have too little impact absorption with only double-stacked cocoons, yet be too stiff to adequately absorb the impact with all triple-stacked cocoons. Thus, the pillow can be modified such that the cocoons have a ratio of double to triple stacked cocoons, of e.g., 75% double-stacked and 25% triple-stacked—which can be evenly distributed throughout the pillow 100. In another embodiment, a specific area of the pillow 100 can have a different cocoon stackup than another area. This is similar to the varying height sections of a pillow described above. In a combination of this varying heights and varying stack densities, a designer may elect to vary the heights of the cocoon stacks as well as the stacking density to achieve the best design within a single pillow 100 that will behave differently depending on where on the pillow the impact is coming from. Also, the stack density can be varied without also varying stack height (these can be varied independently) because the height of a stack is not associated to the number of cocoons within it as the stacks can be assembled by first cutting the cocoon ovoid in half, then sorting by diameter, then stacking e.g. 2 or 3 cocoons halves together. Thereafter, the stack can be cut to a determined height in a manner than controls height, such as the hot wire cutting jig.

The density of the cocoon stacks in the planar (or lateral) direction also affects the ability of the pillow 100 to absorb energy. In some embodiments, the cocoon stacks are positioned within a pillow such that there is essentially no relative (planar/lateral) movement between cocoon stacks. If the cocoon stacks are able to move relative to each other within a pillow, the pillows can naturally move towards a position of lowest potential energy which may create a weak spot in the pillow where there are not enough cocoons present to absorb the energy.

The packing of the cocoons can be a semi-random function due to the high variability in the diameter of the cocoons. In some embodiments, the packaging of cocoon stacks within a pillow evenly distributes the amount of large, medium, and small diameter cocoons. Due to their circular cross section, the cocoons all touch at tangent points creating a moderately nested layout. When the cocoons have no room to move (laterally) side to side, all cocoons are tangent to the adjacent cocoons and the cocoons on the edges are tangent to the sidewalls 104 of the pillow.

Thus, the present disclosure provides the ability to adjust a plurality of attributes: 1) pillow stiffness, 2) cocoon density; and 3) cocoon height, to construct a pillow of a desired impact resistance.

The size and geometry (maximum curvature) of cocoons 10 can present challenges when filling a pillow 100 with cocoons during assembly. For instance, if a pillow becomes too large in surface area, or contains too much curvature, the cocoon stacks become increasingly difficult to position into place within the pillow 100. This is because as the number of cocoons increases, the ability to place them in plane— without dislodging their neighbors out of plane—increases in difficulty. In addition, if the curvature increases too high, the cocoons 10 on the outer edges of a pillow 100 are no longer held in place via gravity, as they tend to dislodge. Thus, in some embodiments an adhesive (e.g. spray adhesive, electrostatic charge, etc.) can be applied to the inside of the pillow top or bottom 101, 102 so that the cocoon's domed tip adheres to the surface of the pillow during installation, and the cocoon 10 remains perpendicular to the contact surface of the pillow 100.

Also, the pillow shape does not need to be uniform or symmetrical. Any pillow shape can be employed provided that any given location of the pillow has an (internal) radius at least equivalent to the cocoon diameter. For example, a T-shaped pillow cannot be more narrow than the smallest cocoon diameter available. For two cocoon diameters in width up until about four diameters, the net stacking width of the cocoons (due to tangential nesting of the cylindrical bases) drives the pillow sizing. Above which point the tangent packing density allows for more flexibility in end shapes. In further reference to a perpendicular downward view of a pillow, the edges or corners of a pillow can have a radius no smaller than the smallest cocoon diameter to ensure the cocoon stack can fill that corner of the pillow. However, there can also be a minimum thickness of a pillow due to the dome/cylindrical shape that provides the best impact resistance. In other words, the impact absorption properties may decrease non-linearly once a certain minimum pillow height is reached as there is no cylindrical sidewall of the cocoon, only a dome shape Additionally, the range of permissible shapes of a pillow is determined by a minimum bend radius due to the intersection of cocoon cylindrical edges or side walls. As a pillow approaches this limit the cocoons in the bend will not able to press against the inside wall of the pillow due to the cylindrical faces of its neighbors interfering with, and preventing a given cocoon from engaging the interior wall of the pillow and creating an airgap in the structure where no impact absorbing cocoon stacks are present, thus decreasing the volumetric efficiency of the pillow to absorb material.

The cocoon stacks can be oriented such that the impact force is applied to the cocoon stack at a relatively perpendicular angle to the cylindrical base of the cut stack. The cocoon domes/apices can be oriented either towards this incoming force, or alternatively oriented opposite this force. This allows for the cocoons to be placed in the most aesthetically pleasing orientation. For example, in a helmet embodiment, the domed shapes face outwards on the outer pillow layer that could be visible by the user, and on the inside pillows of the helmet (i.e. closer to the rider's head) they face the other way so that the domes are visible on the inside surface of the helmet.

The silk pillows allow for the placement of the cocoon stacks in an end product. The pillows can be placed anywhere that impact absorption is required. The pillow's outer shape can be modified to fit the needs of an application. Pillows can be made into full organic shapes as long as the minimum bend and corner radii are considered. This allows for the cocoon impact technology to fit into a wide range of applications. A variety of external shapes of the pillow can be employed without any negative effects on the impact absorbing properties of the underlying materials.

When utilizing pillows 100 for impact absorbing applications it is often desirable to have more thickness of impact absorbing material than is able to be provided by a single layer of cocoons and/or pillows. To achieve this multiple pillows 100 can be stacked on top of each other. These layers need not be attached directly to one another. For example, in some helmet embodiments, it is desired to allow these distinct pillow layers 100 to slide against each other during impact to dissipate the rotational energies within the impact.

These various layers also do not need to have a uniform size, shape, thickness, cocoon stacking density, structure, or any other related features. This can allow a designer to create a stack of pillows 100 with varying properties to allow the end stack up to perform well under multiple impact situations. For example, if an end product needed to protect from a low impact that is more common yet still provide protection against an infrequent impact that is high in magnitude, the designer could choose one (inner) layer of pillow to contain double stacked cocoons (which would crush under the lower impact but provide much lower pass through forces and accelerations to the underlying product to protect) and then choose the outer pillow to contain triple stacked cocoons (which would provide better impact absorbing properties under a high magnitude impact than the double stacked which could allow for less overall forces and acceleration to be transferred to the product to be protected).

In accordance with yet another aspect of the disclosure, when utilizing more than one layer of pillows 100 in a product it can be desirable to ensure the edges/seams between the pillows do not align on the inner and outer layers (as shown in FIG. 11). If the seams directly overlap one another in the layers it can create an area of weakness in the design where forces or objects protrude through the pillow layer and transmit directly to the object to be protected. Conversely, when the seams do not align, the pillows provide a mechanism to spread the load out across the various pillows in the other layers such that an impact that may only affect one pillow on the outer layer is then spread out across multiple pillows on the inner layer, allowing for more surface area of impact absorption thus spreading the load out even further than the initial pillow and decreasing the overall forces and accelerations transferred through to the object being protected. Thus in some embodiments, a plurality of pillow layers are provided (each layer having any number of individual pillows 100), where all pillows are laterally offset such that there no two edges of vertically-adjacent pillows are aligned.

Exemplary Helmet Embodiment

An exemplary embodiment of the present disclosure, as shown in FIGS. 5-10, includes a helmet including several components: a Shell 300, Pillows 100, Skeleton 200, Comfort Liner, Fit System, and a Brim.

Shell (300)

The shell 300 of the helmet is the outermost layer of the helmet. The shell can be a stiff solid outer layer of the helmet that will come into contact with surfaces during an impact. The purpose of the shell is to distribute the forces of an impact to the silk pillows 100 underneath. The construction of the shell can take many forms such as an injection molded piece or pieces of plastic, a vacuum formed piece or pieces of plastic, a composite layup such as carbon fiber or fiberglass, a machined piece or pieces of plastic or any other suitable material that has the requisite stiffness and strength to withstand an impact and transfer the forces to the pillow structures within the helmet. In an exemplary embodiment, a vacuum formed thermoplastic (polycarbonate), forms the shell of the helmet.

The shell distributes the forces from impact over a wider surface area onto the pillows 100 (the next layer in the helmet) than the surface area of the impact was. This allows more pillows (and thus more cocoon 10 stacks within each pillow 100) to be involved in the impact absorption which spreads out the load, lowers the forces and peak G's experienced by the user.

Skeleton (200)

Figure 6:
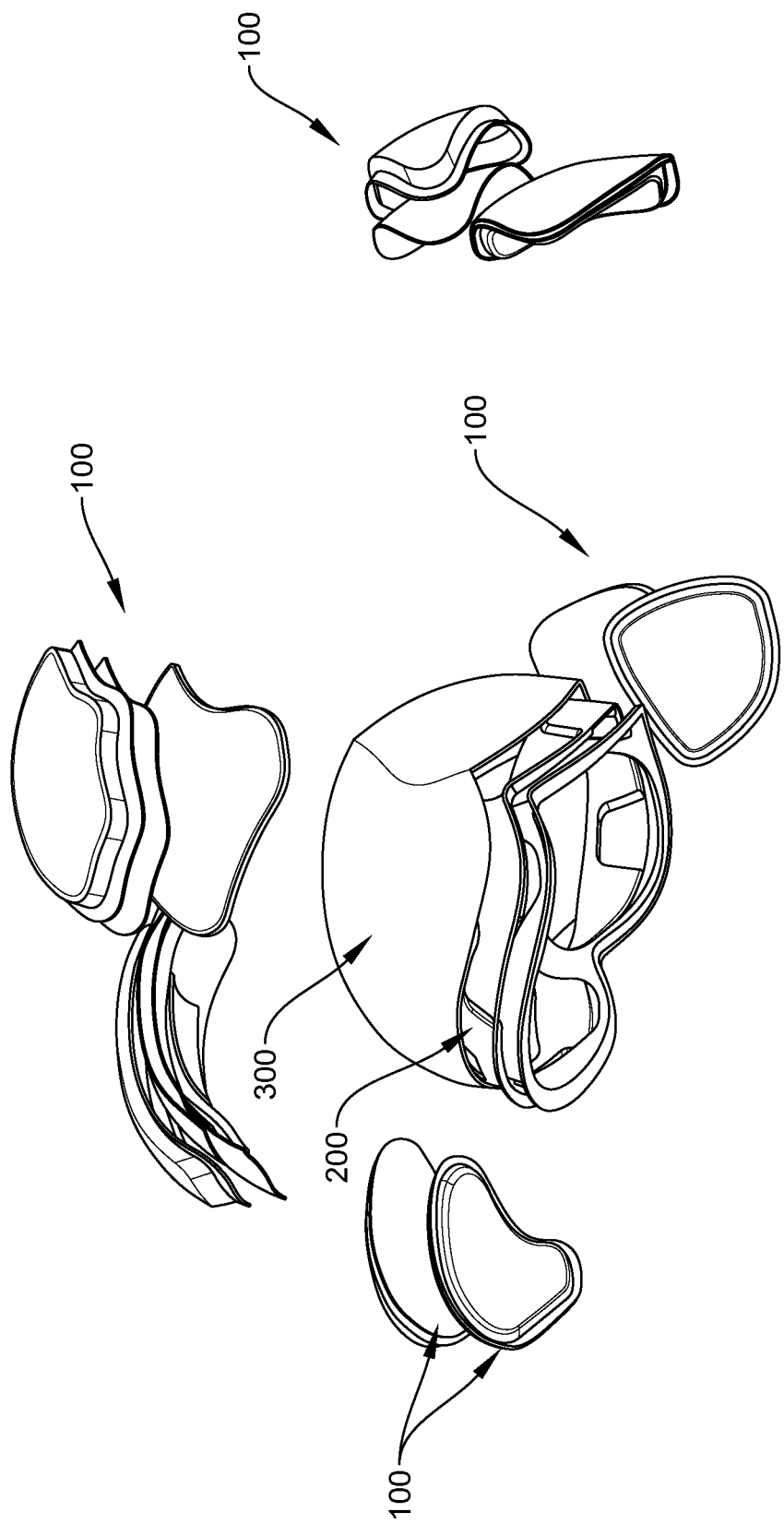
FIG. 6 is an exploded view of the embodiment shown in FIG. 5.
Figure 7:
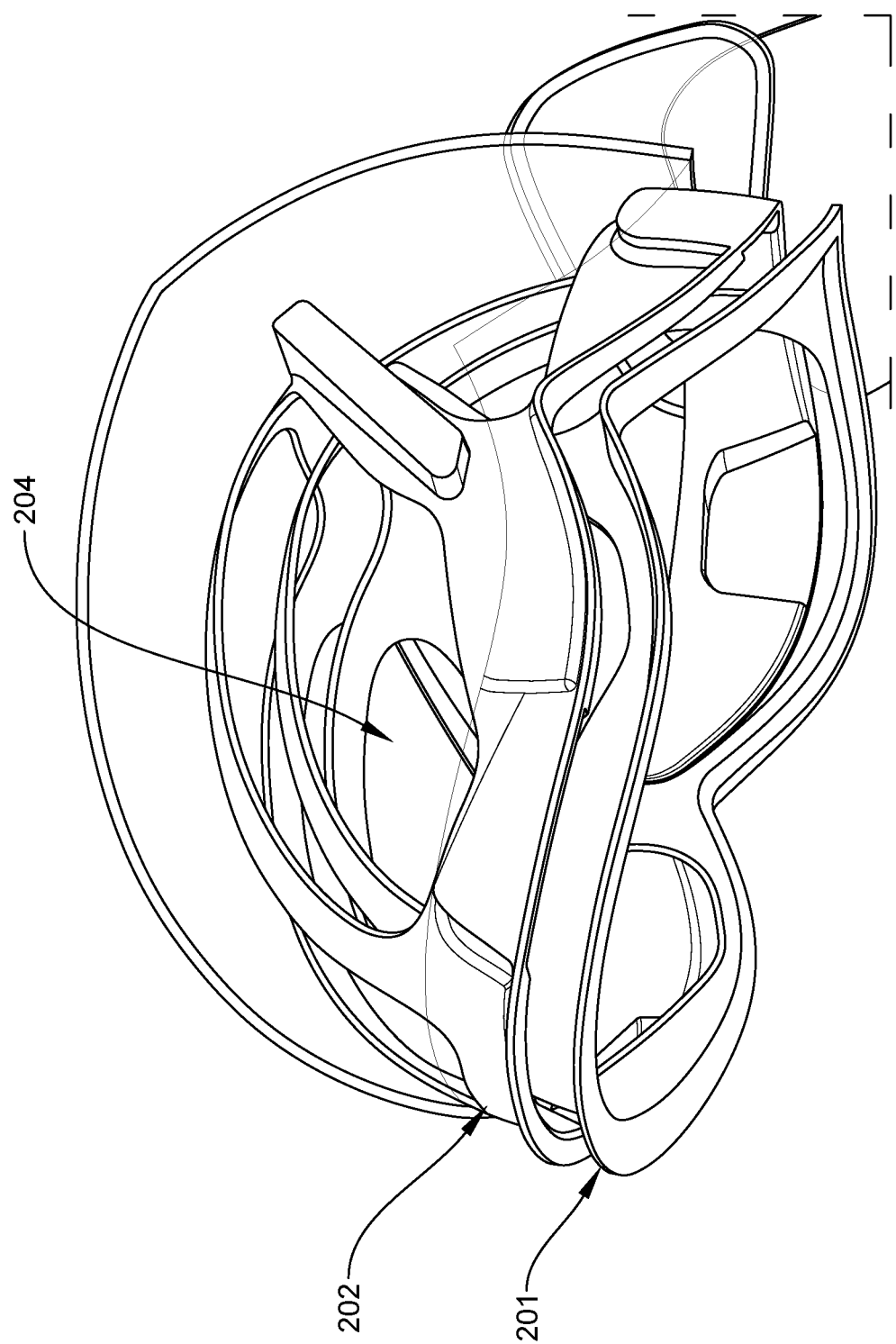
FIG. 7 is an transparent view of the embodiment shown in FIG. 5, with the helmet shell and pillows removed for clarity, to depict the skeleton.
Figure 8:
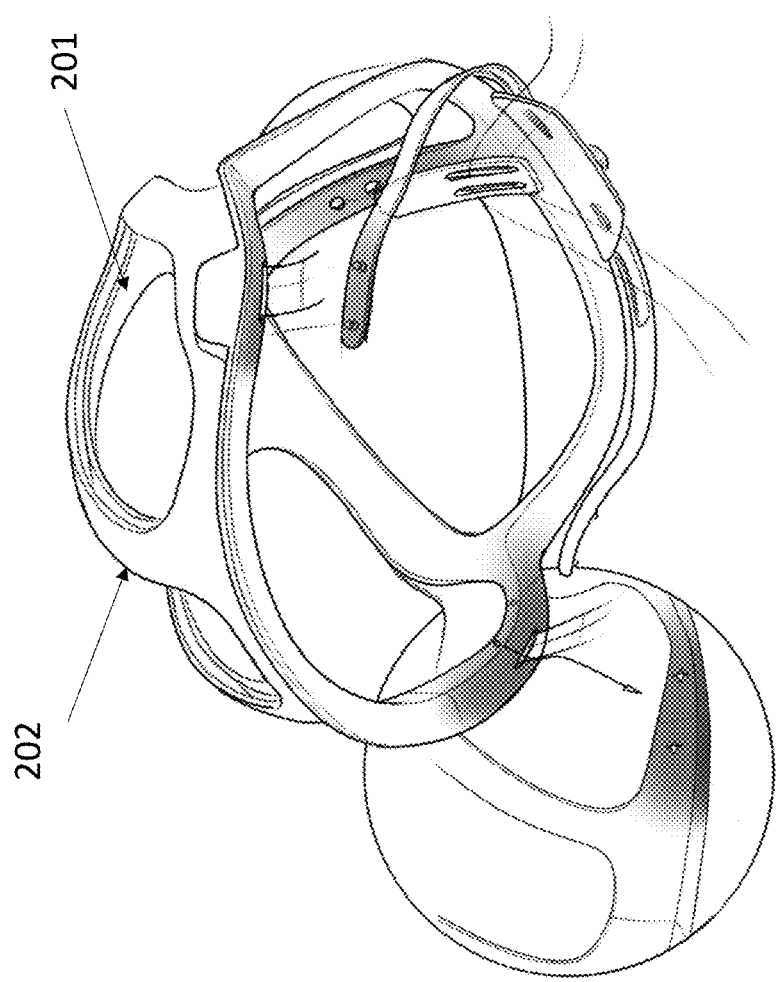
FIGS. 8-10 are schematic representations of a helmet embodiment of the protection device disclosed herein with pillows removed for clarity.
Figure 9:
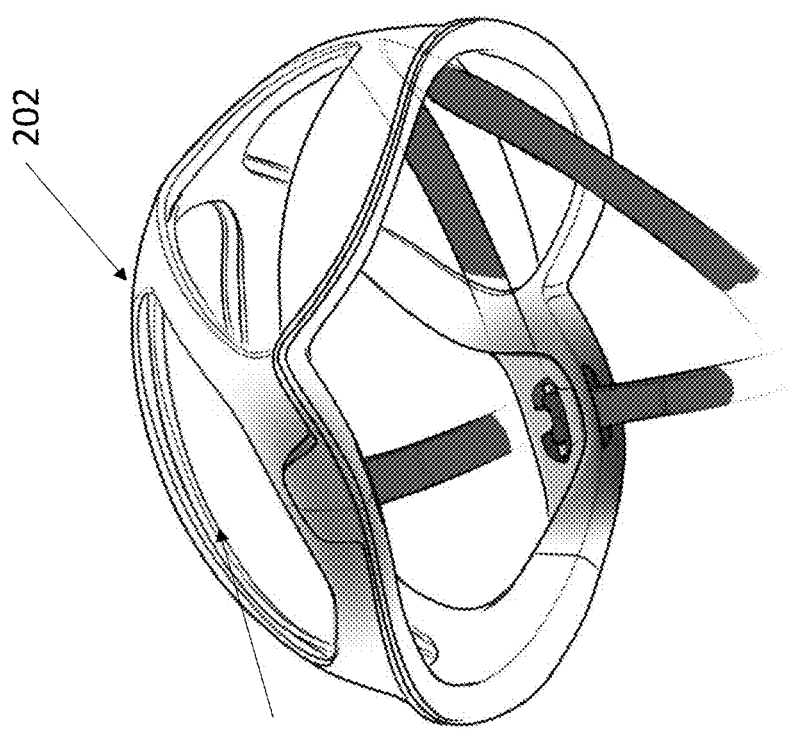
Figure 10:
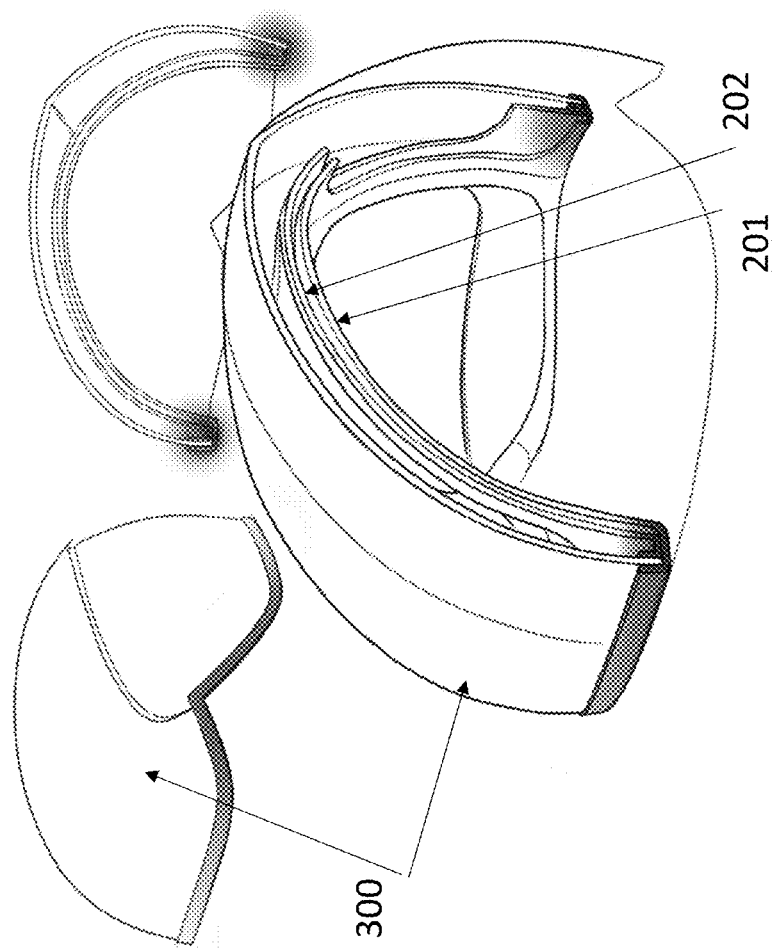

The Skeleton 200 holds the various pillows 100 in place within the helmet provides an attachment means for coupling the pillows to the shell (and/or other internal parts of the helmet). The Skeleton can be formed as a rigid structure made from two or more parts that are rigidly attached together. In the exemplary embodiment, an inner 201 and outer layer 202 of the skeleton that can be coupled together during assembly by methods such as adhesive, mechanical or magnetic coupling, as shown in FIG. 6 (with the shell shown in phantom, and pillows removed for clarity).

The Skeleton has voids (or openings) and rigid elements that can be arranged in such a way that the pillows 100 are nested into the voids 204 of the skeleton and the lips 103 or rims of the pillows are captured (e.g. sandwiched) between the rigid elements of the inner 201 and outer 202 skeleton members. In some embodiments, the pillow(s) 100 can be sized with a complimentary geometry to coincide with the void 204 geometry such that the perimeter of the pillow engages the inner perimeter of the skeleton defining the void 204.

For example in a helmet with two layers of pillows 100, the outer layer of pillow is arranged in such a way that those pillows are inserted into the outer layer 202 of the Skeleton "from the inside" so that the pillow's lip/rim 103 is captured by the rigid sections of the skeleton and the pillow is located into a specific position dictated by the void 204 in the skeleton. At this point in the assembly process, the pillow can "fall out" or be dislodged/removed from its location following the same path it was inserted but cannot be inserted further, rotate in on any axis, or move in any way other than being withdrawn out via the same orientation and angle in which it was inserted. Additionally or alternatively, the skeleton can include anti-rotation features that inhibit/prohibit relative rotation of the pillow 100 with respect to the skeleton frame 200.

This process can be repeated for all pillows in the outer layer as well. In an exemplary embodiment, the pillow of the inner layer can be offset with the pillow of the outer layer so that their respected edges do not align (thus preventing a direct path for the impact force to travel to the user's head, as discussed above). The inner pillows follow the same installation process but the direction is inverted, such that if a pillow is inserted into the inner skeleton it is facing the opposite direction of a pillow on the outer layer and such that when the two halves of the skeleton are filled with pillows they are assembled together and the pillows in the inner and outer layers push against each other and prevent the pillows from moving relative to each other or the assembled skeleton. This skeleton and pillow assembly can serve as a replacement to a traditional polystyrene impact layer within a traditional bicycle helmet. Also, although the exemplary embodiment depicts two layers of pillows, additional/alternative layers can be employed, with each layer including a corresponding skeleton layer as well.

The Skeleton and pillow connections can take a variety of forms. In one embodiment the pillows are constrained within the Skeleton through contact with the skeleton frame surfaces. In another embodiment, the pillows are glued in a fixed position to the skeleton frame. In yet another embodiment, the pillows include individual attachment features such as snap fits, pins, bolts, zip ties, or other such fastening methods as are appropriate for connecting two rigid components in a design.

Comfort Liner

The comfort liner can be made from a soft flexible material to provide a comfortable fit to the user. This liner does not provide significant protection during an impact but is for the benefit of the user during all other use cases of the helmet where an impact is not occurring.

Fit System

The Fit System can connect the user's head to the helmet system. This can contain straps and a locking clasp, and/or adjustment to reposition the helmet on the user's head. Due to the inclusion of the Skeleton and Shell being different parts within the helmet, the fit system has multiple options for attachment location and styles. One embodiment of the fit system may attach to the shell of the helmet. This can be done with adhesives or any other fastening mechanism. The fit system can also be attached to various locations on the Skeleton. This can be advantageous when considering the relative motion of the Skeleton and Shell discussed below.

Figure 5B:
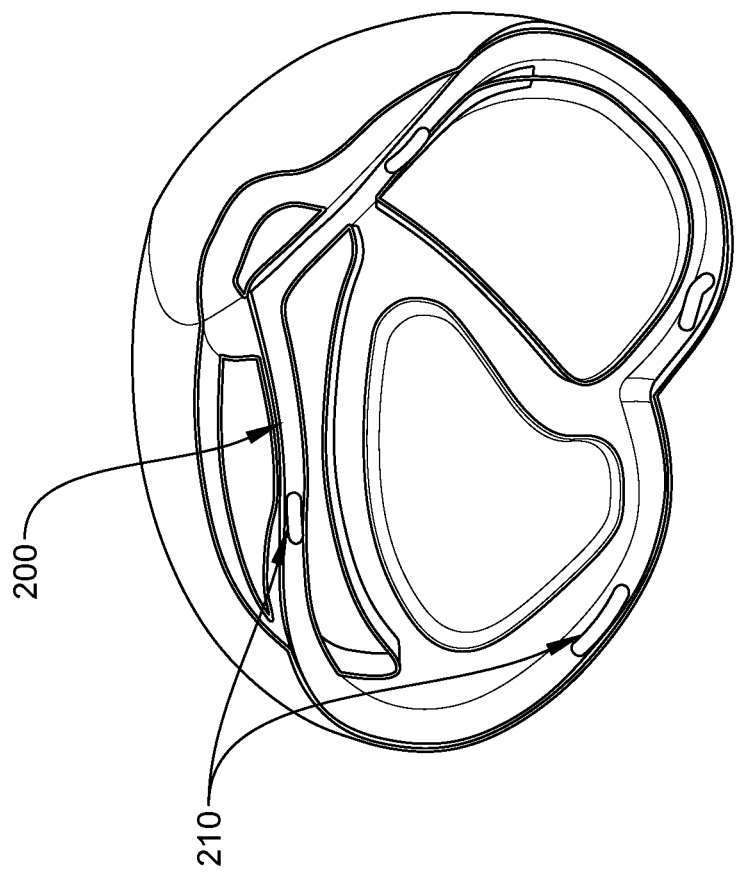
FIGS. 5A-C are exemplary representations of a helmet embodiment of the impact absorption device of the present disclosure.
Figure 5A:
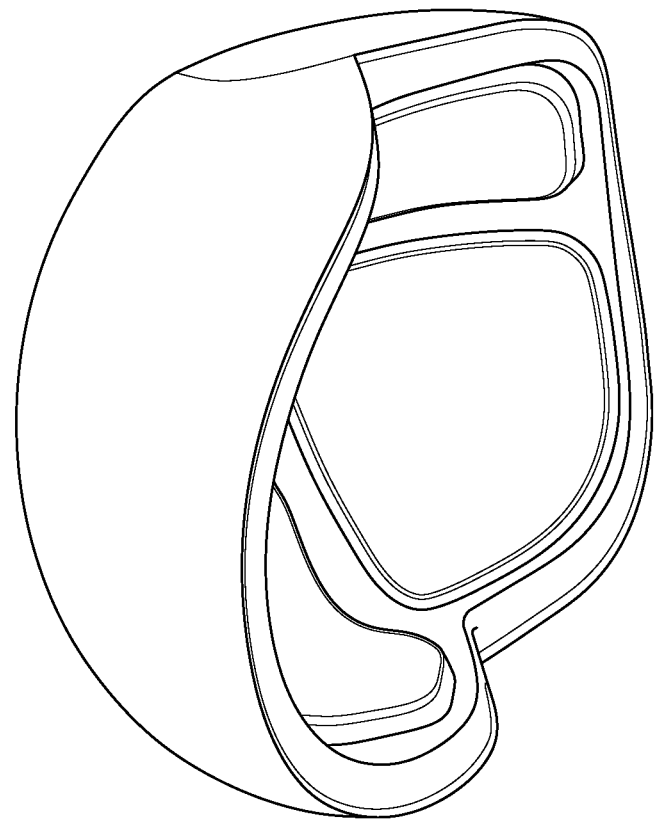
Figure 5C:
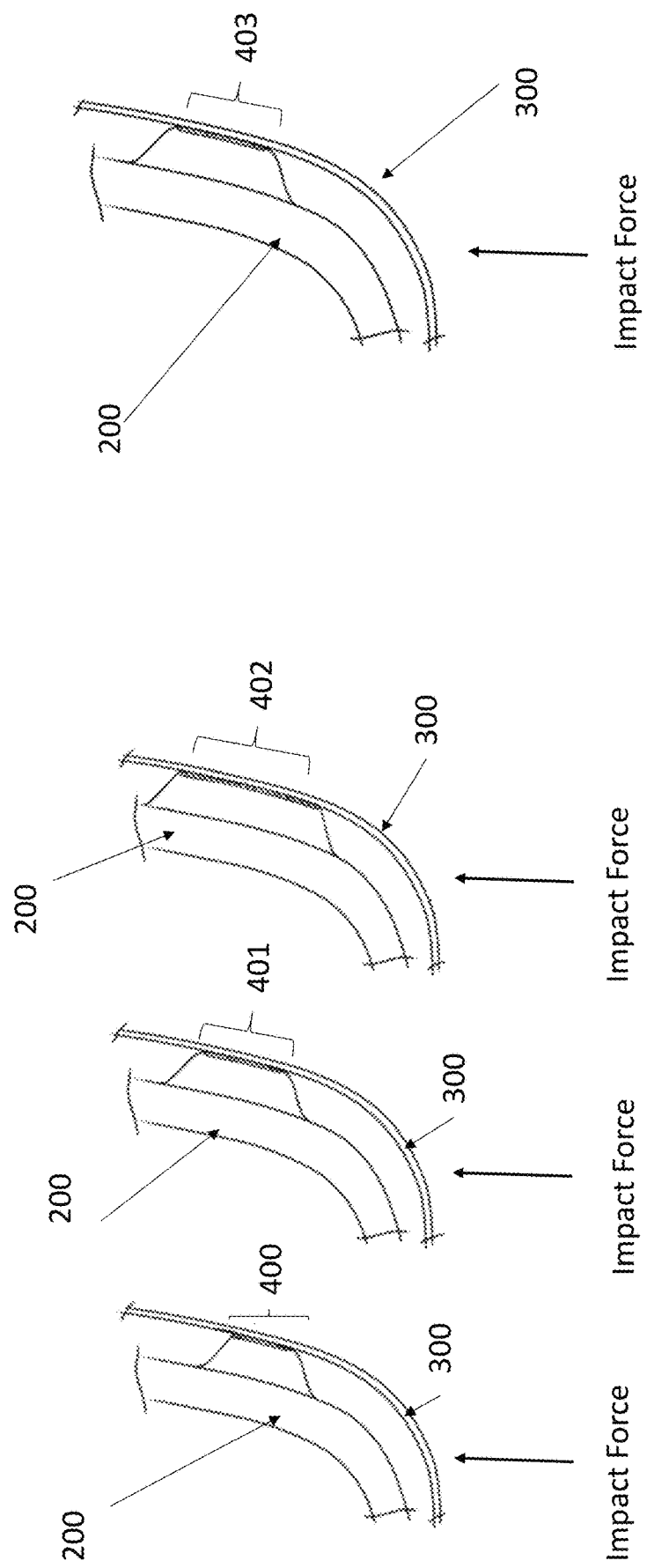

The fit system can be engineered to attach the helmet to the user's head at the point that is most advantageous for allowing relative motion to mitigate rotational energy transferring to the object being protected. Thus, the fit system can be attached to the Skeleton so that the "fixed" attachment is from the users head to some location on one or more parts of the Skeleton, which would allow the shell, pillows, and other portions of the skeleton to have rotational motion while retaining a secure fit to the user. For example, by allowing the shell to rotate relative to the skeleton and thus the user some of the rotational energy can be dissipated in that movement but the helmet overall will still snugly stay on the users head and the skeleton and gross pillow structures will stay in place over the users head to maintain coverage and protection. In one embodiment the fit system can attach to a point on the Skeleton that allows the most relative motion to the Shell. For example, the attachment point can be location 210 (see FIG. 5B) on the Skeleton. Also, the skeleton 200 can move relative to the Shell 300 or other pillows 100 etc. This will allow the user's head to move with that portion of the Skeleton and thus experience the greatest travel, or delta, in rotational motion relative to the point of impact on the shell. This is distinct from conventional designs which do not enable this movement, as their shell and polystyrene impact layer are typically bonded directly together. Additionally or alternatively, the surface area of attachment between skeleton(s) 200 and shell (300) can be increased to accommodate/absorb greater impact forces. As shown in FIG. 5C, the connection area increases 400-403 to provide higher energy absorption of the impact force.

Venting

Figure 11B:
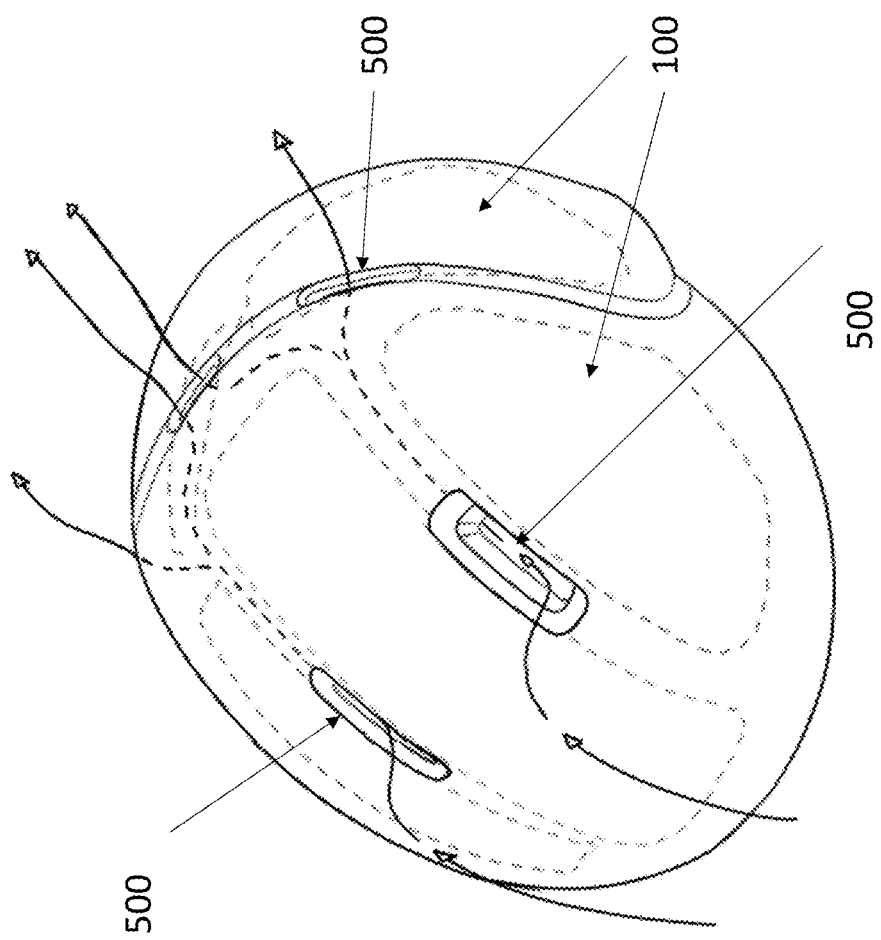
Figure 11C:
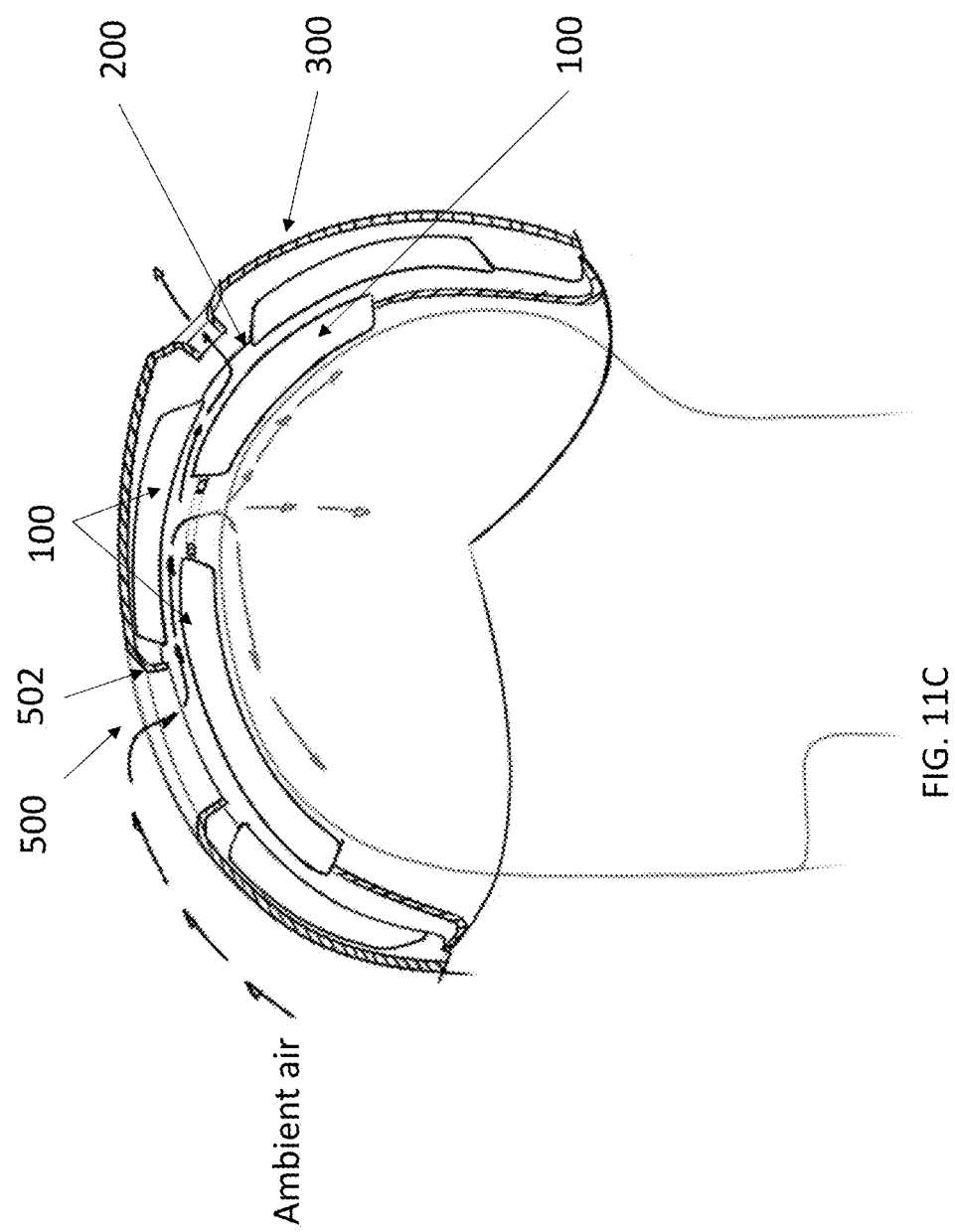

Another feature of the present disclosure is ventilation for the user. In a traditional helmet the vents are simply cut though the shell and polystyrene impact layer to allow air to flow from the exterior of the helmet directly over the user's head to cool the user. In the present disclosure, the Shell 300 includes vent holes 500, however, the path of the airflow is a complex tortious (non-linear) path to the user's head, as shown in FIGS. 11B-D. The pillows 100 are designed in such a way that the airflow can pass between adjacent pillows to the user, both between pillows of the same layer as well as between layers of pillows. In the design of these vents, it is important to consider the loading around the vents 500. To ensure adequate strength and impact absorption in an area around a vent the Shell has vents holes located therein with edges 502 including features that increase the surface area by extending/angling the surface of the Shell to form a strengthening feature or rib to increase the strength in this area (as shown in FIG. 11C-D).

This reinforced edge allows for any forces applied to the area of the vent to be distributed to the surrounding surface of the shell and eventually into the pillows around the vent and slightly removed from the vent. In some embodiments, the Skeleton acts to spread the impact force out among the pillows it contacts as the skeleton can be designed with a level of rigidity as well, allowing it to act as the Shell. The Skeleton in the vent areas may also be designed in such a way that the area surrounding a vent is strengthened in order to spread load applied to a vent to surrounding areas. In some embodiments, the pillows surrounding a vent are purposefully not strengthened to ensure that impact absorption is still adequately tuned to allow for crush of the cocoons and not create rigid/stiff points where an impact can be more directly transferred to a user's head. In other words, the pillows can be designed to be less stiff in select locations to ensure that a "hot spot" or single line impact is not overly stiff allowing a force to make it from the point of impact, directly to a user's head. The goal in this design is such that the pillow directly under a stiff point would deform, this deformation would then lead to the "stiff" parts of the design (shell, skeleton, pillow outer surfaces) to transmit the load to other surrounding pillows that are removed from the area of the stiff vent.

An aspect of the pillow and Skeleton design that is unique to vented areas is that a three dimensional airflow within the Skeleton/Pillow structure is provided to allow airflow through a helmet to a user's head without having to create a direct, line of sight, path to the user. This allows for two unique functions. The main function is that this allows the helmet to have continuous pillow coverage over a user's head without impeding airflow. This is accomplished by creating gaps/spaces between pillow layers that do not have multiple layers of coverage, thus creating a void where air can flow. These voids are located such that they do not overlap but are adjacent to each other. This creates an airpath that is not interrupted but also does not create a direct path to the user for objects or forces to directly reach the user's head. Another function of this tortuous air path is that it is not line of sight and thus from an observer the helmet does not have visible vents allowing for more freedom in aesthetic design.

Rotational Energy Mitigation

During an impact rotation energy transfer can cause serious harm to a user. Another feature of the present disclosure is the ability for the various layers to shift relative to one another during an impact. This movement/slip allows for the mitigation of rotational impact effects experienced during an impact and can be accomplished through a variety of methods that extend throughout the various layers. In some embodiments, the Shell connections to the Skeleton are designed in such a way that the connection points can be specifically engineered to break or disengage at specific impact intensities. This is done through the design of the connection points to fail, either plastically, elastically, or through fracture at specific loads. These connection points may also have a secondary attachment design that acts as a motion stop and is engineered not to break during impact. This frangible design allows for each adjacent layer of pillow to absorb incrementally (e.g. non-linear) larger amount of energy from the impact force.

Figure 12:
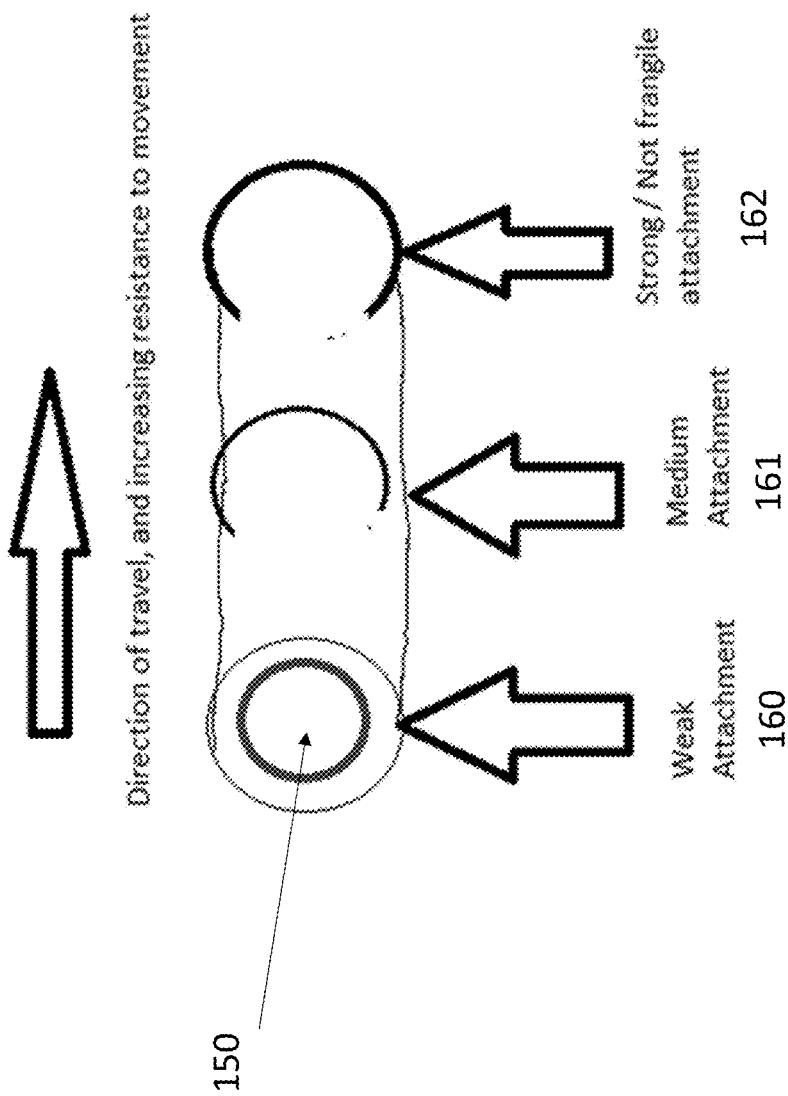
FIGS. 12-13 are schematic representations of exemplary frangible members (e.g. pins) that allow for rupture at a predetermined force threshold and relative movement of components (e.g. pillows) within the impact protection device.

Thus, during an impact of sufficient magnitude the primary attachment method features begin to fail allowing movement of the Skeleton relative to the Shell. The frangible section may break into pieces that are not necessarily attached to the system after the failure. For instance, the point to ensure the two components/pillows that are moving relative to each other have another attachment method such that they are not totally free to be dislodged/removed from the apparatus (e.g. helmet) even after a frangible event. As shown in the exemplary embodiment of FIG. 12, the frangible portion (e.g. pin 150 shown in a top view) can rupture through a series of progressively stronger attachments/holders (e.g. rings 160-162). As the Shell and Skeleton move against each other and a sufficient desired maximum displacement occurs, the secondary attachment design elements stop the motion so that the Shell and Skeleton can no longer move relative to each other. This enables the helmet system to retain the required geometry to protect the user while still allowing the relative motion desired to mitigate rotational impact forces being transferred to the user.

Accordingly, the failure of the primary attachment method is not a single event, but rather a continuous failure that absorbs energy, slows the impact down, and allows the relative velocity of the Skeleton and Shell to ramp up to a peak magnitude—then also gradually ramps down the relative motion as the maximum displacement is reached. This is analogous to the crush that occurs during the compression of the pillows 100 and cocoon stacks 10-12 therein, but is acting in the rotational direction rather than the perpendicular direction that the cocoons absorb impact. The primary connection method accomplishes this goal of velocity ramp by having a designed in non-linear increase in force that resists the displacement as the displacement increases.

Elastomeric/Spring Style

In one embodiment, the primary connection method can utilize an elastomeric material that follows Hooke's Law or any other of the appropriate spring/elastomeric material models such as Fung, Mooney-Rivlin, etc. That is, the further the relative displacement of the Skeleton and the Shell, the greater the force resisting the motion within the connection method.

Prescribed Mechanical Failure

Figure 13:
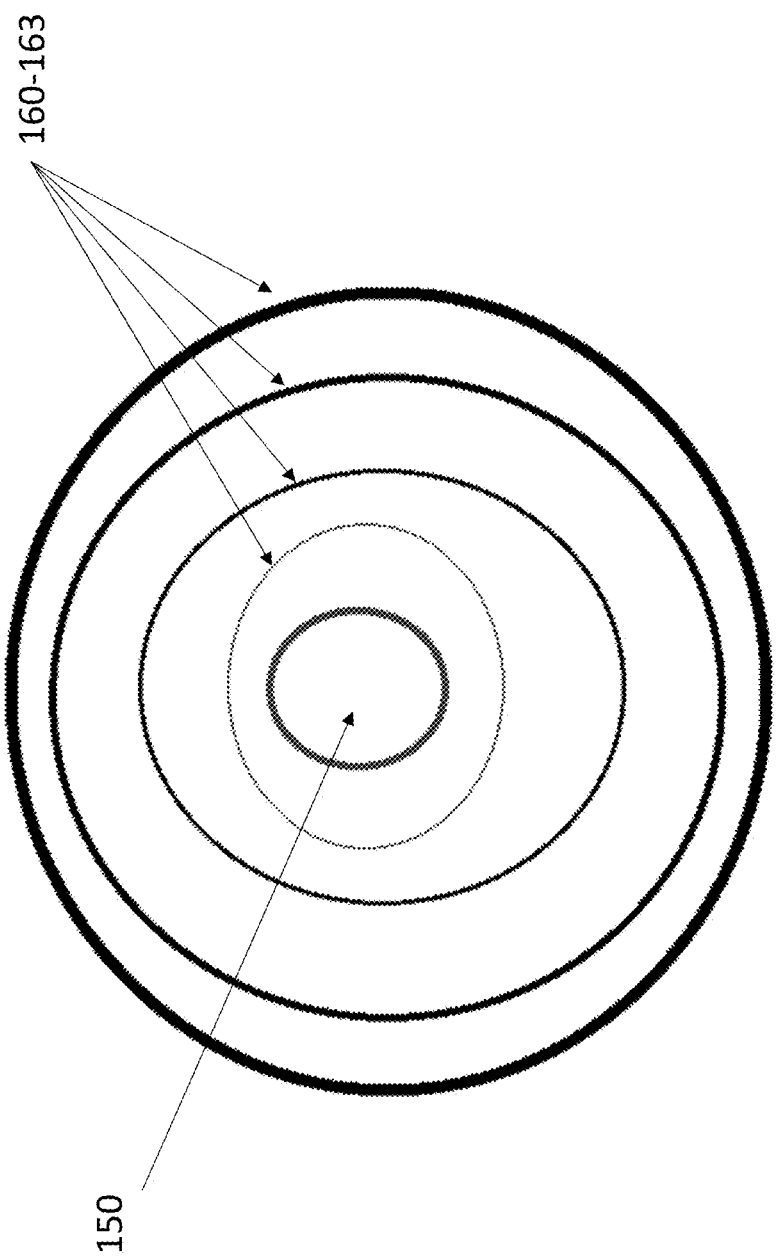
Figure 14:
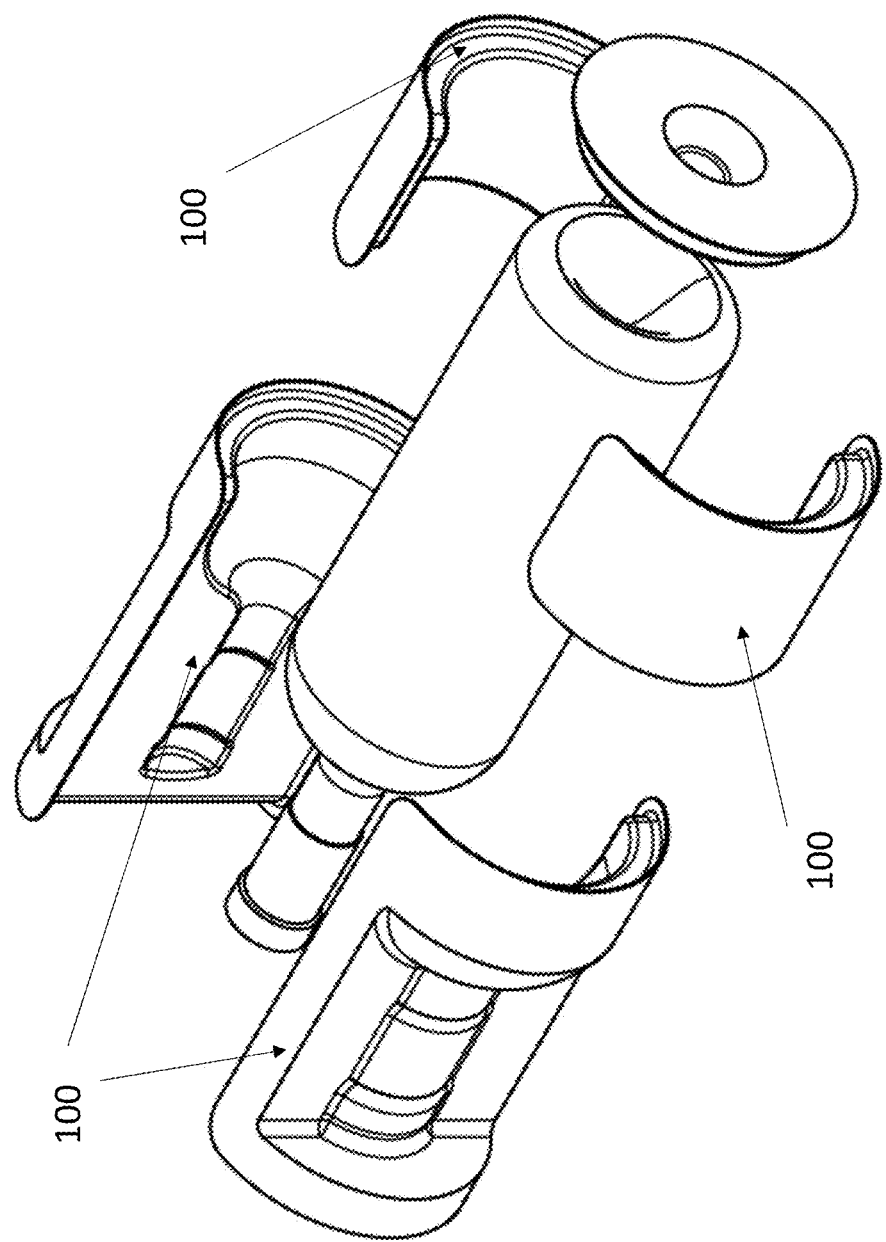
Figure 16:
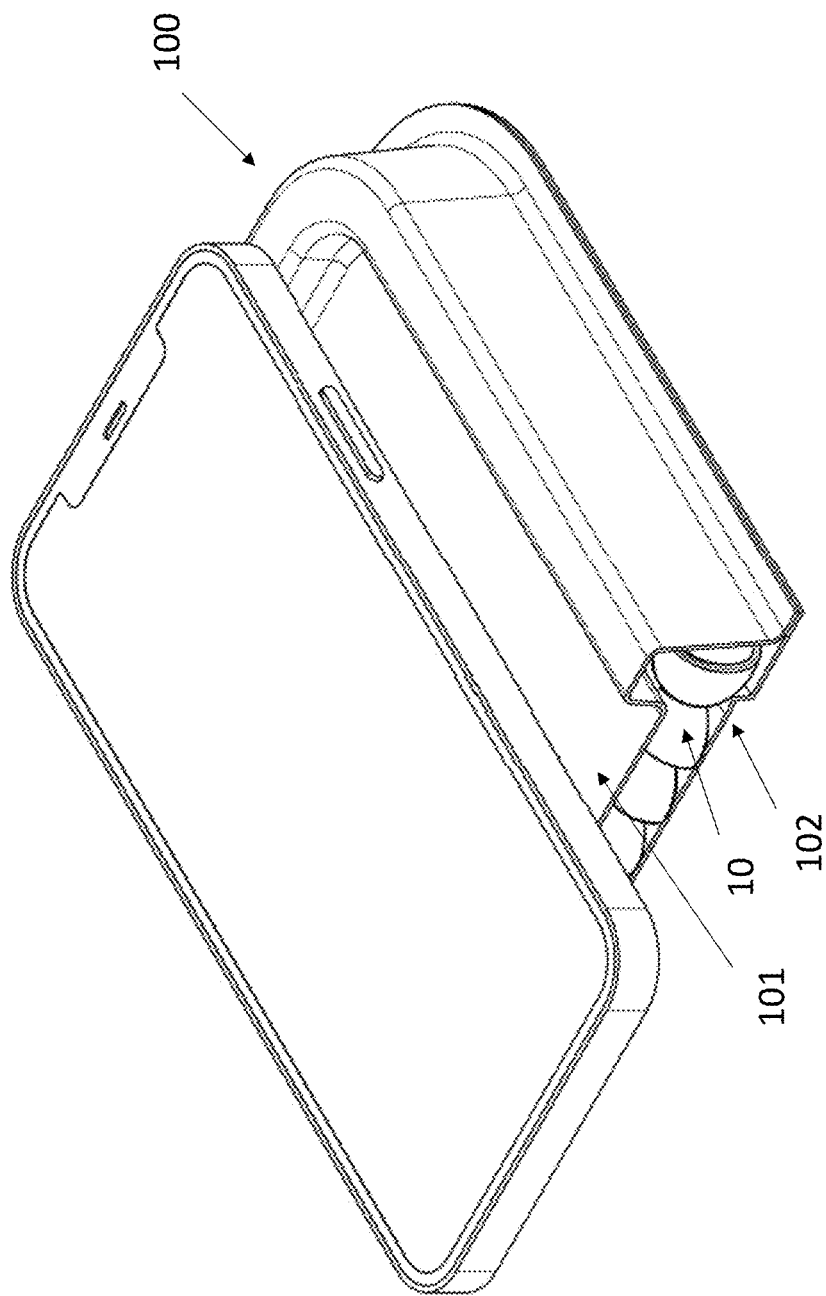
FIG. 16 is another exemplary embodiment (cell phone packaging/case) of the present disclosure.

In another embodiment, the primary connection method can utilize a mechanical connection that increases with strength when traveling down the path of increased displacement of the Skeleton relative to the Shell. An example of this would be to design a catch system with multiple breakpoints through the direction of travel. The exemplary embodiment disclosed provides a connection in one dimension, but a plurality of such connections, with each connection operable in a distinct direction, is within the scope of the present disclosure. Also, a 2D circular or planar example can be described such that a pin 150 may move in a planar direction and break a layer as distance from the center point is increased, as shown in FIG. 13. Multiple layers of frangible structures 160-163 would be oriented such that as the pin 150 moves further from the center each subsequent frangible layer is stronger, represented in the image by increased line thickness. But this increase is strength can be accomplished in any variety of methods, not just making the material thicker. This embodiment may also take on a complex 3D movement relationship utilizing the principles laid out in the 2D and 1D examples laid out here.

For instance, the design can have multiple shear pins with pin stops along a path. Either the pins, the stops, or a combination of thereof can be designed to require varying forces to break. A first pin/stop pair can be configured as the weakest and the only pair that is in rigid contact before an impact. During an impact that is imparting rotational energy, the pin, stop, or both will fail/break and allow for free movement. The assembly will then continue to move until the next pin/stop is hit and then broken. Each subsequent pin/stop combination can be designed in such a way that they are allowed a prescribed amount of relative motion before contact, specifically at least more than the previous pair to allow for free motion prior to engagement of that specific pair. After the previous pin/stop pair has failed the Shell and Skeleton will move relative to each other up until the next pin/pair contact point is reached.

In this system design the strength or force required to fail the pin/stop connection is increased from one pair to the next through traditional mechanical engineering techniques such as larger pins, more reinforced stops, different materials, and combinations thereof or any other technique suitable to control the failure force of the connection. This design element can also be replicated for the desired distance of travel. This increase in break force allows the system to resist motion with increasing force as the displacement increases. In the helmet embodiment, this pin/stop design does not necessarily need to be "in line" or sequentially oriented. In other words, the next strongest pin does not necessarily need to be physically located directly next to the next weakest pin in order, instead they can be placed throughout the design as desired without impacting the functionality of the mechanism.

This controlled relative motion design mechanism is repeated throughout the helmet and can be implemented in the connection from the Shell to the Skeleton, within the Skeleton to its various layers and to the pillows contained within. Allowing this controlled relative motion in the stack up that is Shell, Outer Skeleton, outer pillow, inner pillow, inner skeleton allows for multiple planes of relative motion. Also, these components can move at different times (e.g. have different frangible thresholds), rates of speed, and in different directions. These planes have an additive effect on the total amount of relative motion allowable. This system can also be designed in such a way that the various layers of relative motion require different forces to allow motion, thus allowing the overall design to allow relative motion, thus mitigating rotation impact effects, in impacts of varying intensities while still allowing coverage for the weakest and the strongest impact. This multilayer approach can significantly decrease the complexity required to accomplish the controlled relative motion across various impact strengths as compared to other technologies.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A protection device comprising:
a pillow, the pillow including: a top layer having a first end and a second end, a bottom layer having a first end and a second end, with a circumscribing seal formed between the top and bottom layers to define an internal volume within the pillow; and at least one partial cocoon, the partial cocoon formed from silk from a silkworm, sealably disposed within the internal volume of the pillow, the partial cocoon having a dome shape with a closed apex at a first end and a cylindrical opening at a second end; with the closed apex directly contacting the top layer of the pillow and the cylindrical opening directly contacting the bottom layer of the pillow; wherein the at least one partial cocoon abuts an adjacent the partial cocoon.

2. The protection device of claim 1, wherein at least two partial cocoons are disposed within the pillow.

3. The protection device of claim 2, wherein the at least two partial cocoons are in vertical alignment.

4. The protection device of claim 1, wherein the pillow has an asymmetrical shape.

5. A protection device comprising:
a pillow, the pillow including:
a top layer having a first end, a second end, and a first sidewall extending therefrom, the first sidewall including a first outwardly projecting lip which circumscribes the top layer;
a bottom layer having a first end, a second end, and a second sidewall extending therefrom, the second sidewall including a second outwardly projecting lip which circumscribes the bottom layer;
a seal formed between the first lip and second lip to define an internal volume within the pillow; and
a plurality of partial cocoons disposed within the pillow, each partial cocoon having a dome shape with a closed apex at a first end and a cut edge comprising a cylindrical opening at a second end; with at least one closed apex directly contacting the top layer of the pillow and at least one cylindrical opening directly contacting the bottom layer of the pillow; wherein each partial cocoon is distinct from an adjacent partial cocoon, and each abuts at least an adjacent partial cocoon to limit lateral displacement of the plurality of the partial cocoons; and
wherein the plurality of partial cocoons includes at least one stack of partial cocoons, the at least one stack having a first partial cocoon vertically aligned with and at least partially nested within a second partial cocoon.

6. The protection device of claim 5, wherein the plurality of partial cocoons includes at least one stack of partial cocoons, wherein each stack includes multiple partial cocoons vertically aligned with the circumference of the cut edge of the cylindrical opening of a second partial cocoon contacting an exterior surface of an underlying first partial cocoon.

7. The protection device of claim 6, wherein an apex of a second cocoon in a stack is spaced from the apex of an underlying first cocoon in the stack.

8. The protection device of claim 7, wherein at least one of the plurality of partial cocoons deforms in a vertical direction with the apex of the cocoon displaced downwardly into the cocoon interior upon application of an impact force.

9. The protection device of claim 8, wherein at least one of the plurality of partial cocoons maintains a cylindrical opening upon application of an impact force.

10. The protection device of claim 5, wherein at least two stacks of the plurality of partial cocoons have different heights disposed within the pillow.

11. The protection device of claim 5, wherein a first stack of the plurality of partial cocoons comprises two vertically aligned partial cocoons and a second stack of the plurality of partial cocoons comprises three vertically aligned partial cocoons, each of the first stack and the second stack disposed within the pillow.

12. The protection device of claim 5, wherein the top layer of the pillow has a curvilinear shape.

13. The protection device of claim 5, wherein spacing between the top layer of the pillow and bottom layer of the pillow is non-uniform between the edges of the pillow.

14. The protection device of claim 5, wherein an exterior surface of the top layer or the bottom layer of the pillow includes a strengthening feature.

15. A protection device comprising:
a plurality of pillows, each pillow including:
a top layer having a first end, a second end, and a first sidewall extending therefrom, the first sidewall including a first outwardly projecting lip which circumscribes the top layer;
a bottom layer having a first end, a second end, and a second sidewall extending therefrom, the second sidewall including a second outwardly projecting lip which circumscribes the bottom layer;
a seal formed between the first lip and second lip to define an internal volume within the pillow; and
a plurality of partial cocoons sealably disposed within the internal volume of each pillow, each partial cocoon having a dome shape with a closed apex at a first end and a cylindrical opening at a second end; with the closed apex directly contacting the top layer of the pillow and the cylindrical opening directly contacting the bottom layer of the pillow;
wherein each partial cocoon abuts an adjacent partial cocoon to limit lateral displacement of the plurality of partial cocoons; and wherein a first pillow is disposed at a first position within the device and a second pillow at a second position within the device.

16. The protection device of claim 15, wherein the second position of the second pillow is located below the first position of the first pillow.

17. The protection device of claim 16, wherein the second position of the second pillow is laterally spaced from the first position of the first pillow, with the first end of the first pillow offset from the first end of the second pillow.

18. The protection device of claim 17, wherein the first pillow is configured to move relative to the second pillow.

19. The protection device of claim 18, wherein the first pillow is configured to move laterally relative to the second pillow.

\* \* \* \* \*